US012103260B2

(12) United States Patent
Graham et al.

(10) Patent No.: US 12,103,260 B2
(45) Date of Patent: Oct. 1, 2024

(54) MACHINE AND METHODS FOR ATTACHING A TRAY BLANK TO A COVER BLANK

(71) Applicant: WESTROCK SHARED SERVICES, LLC, Atlanta, GA (US)

(72) Inventors: Thomas Dean Graham, Winter Garden, FL (US); Amer Aganovic, Orlando, FL (US); Gregory Scott Gulik, DeLand, FL (US)

(73) Assignee: WestRock Shared Services, LLC, Atlanta, GA (US)

( * ) Notice: Subject to any disclaimer, the term of this patent is extended or adjusted under 35 U.S.C. 154(b) by 0 days.

(21) Appl. No.: 17/866,048

(22) Filed: Jul. 15, 2022

(65) Prior Publication Data

US 2022/0347959 A1 Nov. 3, 2022

Related U.S. Application Data

(63) Continuation of application No. 15/949,958, filed on Apr. 10, 2018, now Pat. No. 11,400,679.

(51) Int. Cl.
*B31B 50/04* (2017.01)
*B31B 50/06* (2017.01)
(Continued)

(52) U.S. Cl.
CPC .......... *B31B 50/044* (2017.08); *B31B 50/042* (2017.08); *B31B 50/06* (2017.08);
(Continued)

(58) Field of Classification Search
CPC .......... B31B 2120/302; B31B 2120/10; B31B 2110/35; B31B 50/06; B31B 50/624; B31B 50/042; B31B 2120/40
(Continued)

(56) References Cited

U.S. PATENT DOCUMENTS 2,776,606 A 1/1957 Fischer et al.
2,801,578 A 8/1957 Bayley
(Continued)

FOREIGN PATENT DOCUMENTS

| | | |
|---|---|---|
| DE | 9207356 | 8/1992 |
| EP | 3176103 | 11/2017 |
| FR | 2828170 | 2/2003 |

*Primary Examiner* — Robert F Long
*Assistant Examiner* — Xavier A Madison
(74) *Attorney, Agent, or Firm* — Neil G. Cohen; Rohini K. Garg

(57) ABSTRACT

A machine including a first deck, a second deck, a first blank transfer assembly, and a second blank transfer assembly is provided. The first and second decks are coupled to a frame. The first blank transfer assembly extends from a first end to a second end and includes a first pick-up assembly moveable between the first end, proximate the second deck, and the second end, proximate the first deck. The second blank transfer assembly extends from a third end to a fourth end and includes a second pick-up assembly moveable between the third end, proximate the second deck, and the fourth end, proximate the first deck. The first blank transfer assembly and the second blank transfer assembly are operationally offset when moving between the first and second ends and the third and fourth ends, respectively.

20 Claims, 19 Drawing Sheets

(51) Int. Cl.

| | |
|---|---|
| ***B31B 50/07*** | (2017.01) |
| ***B31B 50/62*** | (2017.01) |
| *B31B 110/35* | (2017.01) |
| *B31B 120/10* | (2017.01) |
| *B31B 120/30* | (2017.01) |

(52) U.S. Cl.
CPC ............ *B31B 50/07* (2017.08); *B31B 50/624* (2017.08); *B31B 2110/35* (2017.08); *B31B 2120/10* (2017.08); *B31B 2120/302* (2017.08)

(58) Field of Classification Search
USPC .......................................................... 493/114
See application file for complete search history.

(56) References Cited

U.S. PATENT DOCUMENTS

| | | | | |
|---|---|---|---|---|
| 3,964,953 | A * | 6/1976 | Mitchard | .............. B32B 29/002 493/379 |
| 4,186,868 | A | 2/1980 | Coleman | |
| 4,197,789 | A | 4/1980 | Moen | |
| 4,461,137 | A | 7/1984 | Wood | |
| 4,650,448 | A | 3/1987 | Urso | |
| 4,798,571 | A | 1/1989 | Everman et al. | |
| 5,447,487 | A | 9/1995 | Alberto | |
| 6,015,084 | A | 1/2000 | Mathieu et al. | |
| 6,264,034 | B1 | 7/2001 | Bacques et al. | |
| 7,381,176 | B2 | 6/2008 | Graham et al. | |
| 7,682,300 | B2 | 3/2010 | Graham et al. | |
| 8,409,064 | B2 | 4/2013 | Desertot et al. | |
| 8,939,352 | B2 | 1/2015 | Delause et al. | |
| 2006/0113364 | A1 | 6/2006 | Bonner et al. | |
| 2009/0277953 | A1 | 11/2009 | Mathieu et al. | |
| 2010/0069209 | A1 | 3/2010 | Jannin | |
| 2011/0053746 | A1 | 3/2011 | Desertot | |
| 2014/0155238 | A1 | 6/2014 | Thompson et al. | |
| 2016/0280407 | A1 | 9/2016 | Lindt et al. | |
| 2016/0297600 | A1 | 10/2016 | Mcdonald et al. | |
| 2017/0080666 | A1 | 3/2017 | Graham et al. | |
| 2017/0080667 | A1 | 3/2017 | Graham et al. | |
| 2017/0320608 | A1 | 11/2017 | Graham et al. | |

* cited by examiner

MACHINE AND METHODS FOR ATTACHING A TRAY BLANK TO A COVER BLANK

CROSS-REFERENCE TO RELATED APPLICATION DATA

This application is a continuation of U.S. patent application Ser. No. 15/949,958 filed on Apr. 10, 2018, the entire contents of which are incorporated herein by reference.

BACKGROUND

This disclosure relates generally to a machine for forming a blank assembly, and more specifically to a machine and methods for forming a blank assembly including a tray blank coupled to a cover blank.

E-commerce is growing to represent a substantial part of the global economy. As e-commerce grows, the need for shipping packages containing goods also increases. Containers for shipping goods are typically made in standard or predetermined sizes, and then are purchased and used to ship the goods therein. In some cases, these containers can then be used to display the goods at a merchant's store or business after the goods have been shipped to the merchant.

Therefore, there is a need for shipping containers that can be used to display goods after the container has been shipped. The need for special containers is increasing with growing e-commerce and the growing practice of displaying goods in the containers that they were shipped in, especially at outlet stores and supermarkets. In addition, there is a need for a machine that can quickly make blank assemblies to be formed into such containers.

BRIEF DESCRIPTION

In one embodiment, a machine comprising a first deck, a second deck, a first blank transfer assembly, and a second blank transfer assembly is provided. The first and second decks are coupled to a frame. The first blank transfer assembly extends from a first end to a second end and includes a first pick-up assembly moveable between the first end that is proximate the second deck and the second end that is proximate the first deck. The second blank transfer assembly extends from a third end to a fourth end and includes a second pick-up assembly moveable between the third end that is proximate the second deck and the fourth end that is proximate the first deck. The first blank transfer assembly and the second blank transfer assembly are operationally offset when moving between the first and second ends and the third and fourth ends, respectively.

In another embodiment, a method for forming a plurality of blank assemblies using a machine is provided. The plurality of blank assemblies includes a first blank assembly including a first cover blank and a first tray blank coupled to the first cover blank and a second blank assembly including a second cover blank and a second tray blank coupled to the second cover blank. The method includes positioning the first and second cover blanks on a first deck coupled to a frame of the machine and advancing the first cover blank to a first position on the first deck and the second cover blank to a second position on the first deck. The method also includes positioning the first and second tray blanks on a second deck coupled to the frame of the machine, and advancing the first tray blank to a first position on the second deck and the second tray blank to a second position on the second deck. The first tray blank is transferred from proximate a first end of a first blank transfer assembly to proximate a second end of the first blank transfer assembly using a first pick-up assembly of the machine. The first tray blank is deposited proximate the second end of the first blank transfer assembly in an at least partially overlying relationship with the first cover blank positioned on the first deck. The second tray blank is transferred from proximate a third end of a second blank transfer assembly to proximate a fourth end of the second blank transfer assembly using a second pick-up assembly of the machine, operationally offset from the transferring of the first tray blank. The second tray blank is deposited proximate the fourth end of the second blank transfer assembly in an at least partially overlying relationship with the second cover blank positioned on the first deck.

In a further embodiment, a machine for forming a blank assembly including a first cover blank and a first tray blank coupled to the first cover blank and a second cover blank and a second tray blank coupled to the second cover blank is provided. The machine includes a first deck coupled to a frame, wherein the first and second cover blanks are positioned on the first deck, and a second deck coupled to the frame, wherein the first and second tray blanks are positioned on the second deck. The machine also includes a first blank transfer assembly extending from a first end to a second end, the first blank transfer assembly including a first pick-up assembly moveable between the first end and the second end. The first pick-up assembly is configured to pick up the first tray blank proximate the first end and deposit the first tray blank proximate the second end in an at least partially overlying relationship with the first cover blank positioned on the first deck. The machine also includes a second blank transfer assembly extending from a third end to a fourth end, the second blank transfer assembly including a second pick-up assembly moveable between the third end and the fourth end. The second pick-up assembly is configured to pick up the second tray blank proximate the third end and deposit the second tray blank proximate the fourth end in an at least partially overlying relationship with the second cover blank positioned on the first deck. The first blank transfer assembly and the second blank transfer assembly are operationally offset when transferring the first tray blank and transferring the second tray blank.

In yet another embodiment, a machine including a first deck, a second deck, a first gantry, and a second gantry is provided. The first and second decks are coupled to a frame. The first gantry is configured to move between the first deck and the second deck. The second gantry is configured to move between the first deck and the second deck in an operationally offset manner from the first gantry.

DETAILED DESCRIPTION

The machine described herein for forming a blank assembly including a tray blank coupled to a cover blank, overcomes the limitations of known machines for forming blank assemblies. The machine described herein includes a first tray blank transfer assembly and a second tray blank transfer assembly operationally offset from one another. The first and second tray blank transfer assemblies are configured to pick and place a first and a second tray blank in an at least partially overlying relationship with the respective first and second cover blanks positioned on a machine deck.

Figure 1:
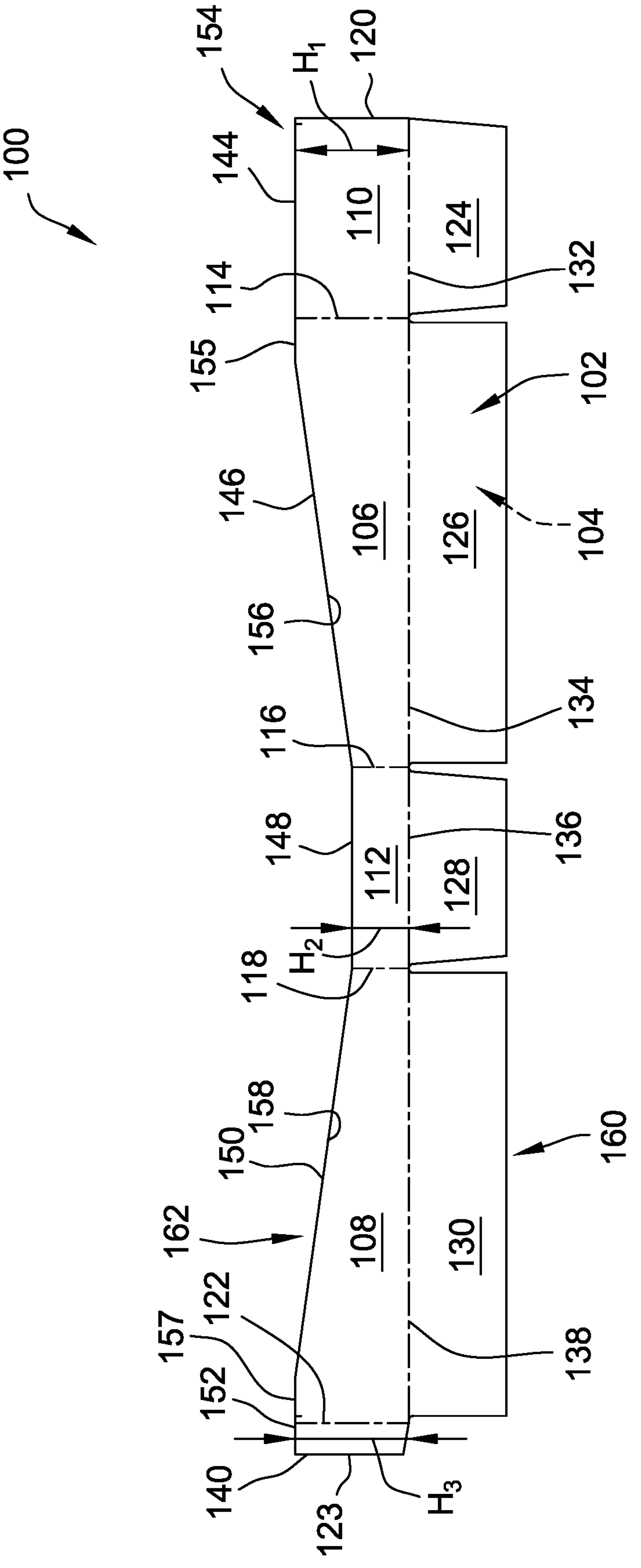
FIG. 1 is a top plan view of a tray blank of sheet material for constructing a blank assembly.

FIG. 1 illustrates a top plan view of an example embodiment of a substantially flat tray blank 100 of sheet material. As explained below in more detail, tray blank 100 is coupled to another blank (a cover blank 200, shown in FIG. 2) to form a blank assembly 300 (shown in FIG. 3). Tray blank 100 includes an exterior surface 102 and an interior surface 104. As shown in FIG. 1, tray blank 100 extends from a leading edge 160 to a trailing edge 162 and includes a series of aligned side panels and end panels coupled together in series along preformed, generally parallel, fold lines. Specifically, the side panels include a first side panel 106 and a second side panel 108, and the end panels include a first end panel 110 and a second end panel 112. First end panel 110, first side panel 106, second end panel 112, and second side panel 108 are coupled together in series along preformed fold lines 114, 116, and 118, respectively. First end panel 110 extends from a first free edge 120 to fold line 114, first side panel 106 extends between first and second end panels 110 and 112 from fold line 114 to fold line 116, second end panel 112 extends between first side panel 106 and second side panel 108 from fold line 116 to fold line 118, and second side panel 108 extends from fold line 118 to a fold line 122. A glue panel 140 extends from second side panel 108 along fold line 122, to a second free end 123. In certain embodiments, portions of exterior surface 102 and/or interior surface 104 of blank 100 include printed graphics, such as advertising and/or promotional materials.

Tray blank 100 also includes a first bottom flap 124 coupled to first end panel 110 along a fold line 132. A second bottom flap 126 is coupled to first side panel 106 along a fold line 134, a third bottom flap 128 is coupled to second end panel 112 along a fold line 136, and a fourth bottom flap 130 is coupled to second side panel 108 along a fold line 138. Fold lines 132, 134, 136, and 138 are generally parallel to one another and generally perpendicular to fold lines 114, 116, 118, and 122.

Tray blank 100 further includes a first top edge 144 of first end panel 110, a second top edge 146 of first side panel 106, a third top edge 148 of second end panel 112, a fourth top edge 150 of second side panel 108, and a fifth top edge 152 of glue panel 140. Top edges 144, 146, 148, 150, and 152 are substantially continuous with one another and collectively define a "clean" tray top edge 154 of tray blank 100 (e.g., no detritus from removal of a perforated section). In the illustrated embodiment, top edges 146 and 150 include respective first, generally horizontal portions 155 and 157 as well as respective angled portions 156 and 158, such that tray blank 100 has a varying height (e.g., from a first height $H_1$ of first end panel 110 to a second height $H_2$ of second end panel 112). In an alternative embodiment, top edges 146 and 150 do not include angled portions 156 and 158, such that tray blank 100 has a substantially uniform height. In the illustrated embodiment, glue panel 140 has a height $H_3$ that is substantially equal to first height $H_1$ of first end panel 110.

Of course, tray blanks having shapes, sizes, and configurations different from tray blank 100 described and illustrated herein may be used in machine 1000 (shown in FIG. 4) without departing from the scope of the present invention. For example, tray blank 100 is shown as a four-sided container, but could be a six-sided container, an eight-sided container, or an N-sided container without departing from the scope of this disclosure.

Figure 2:
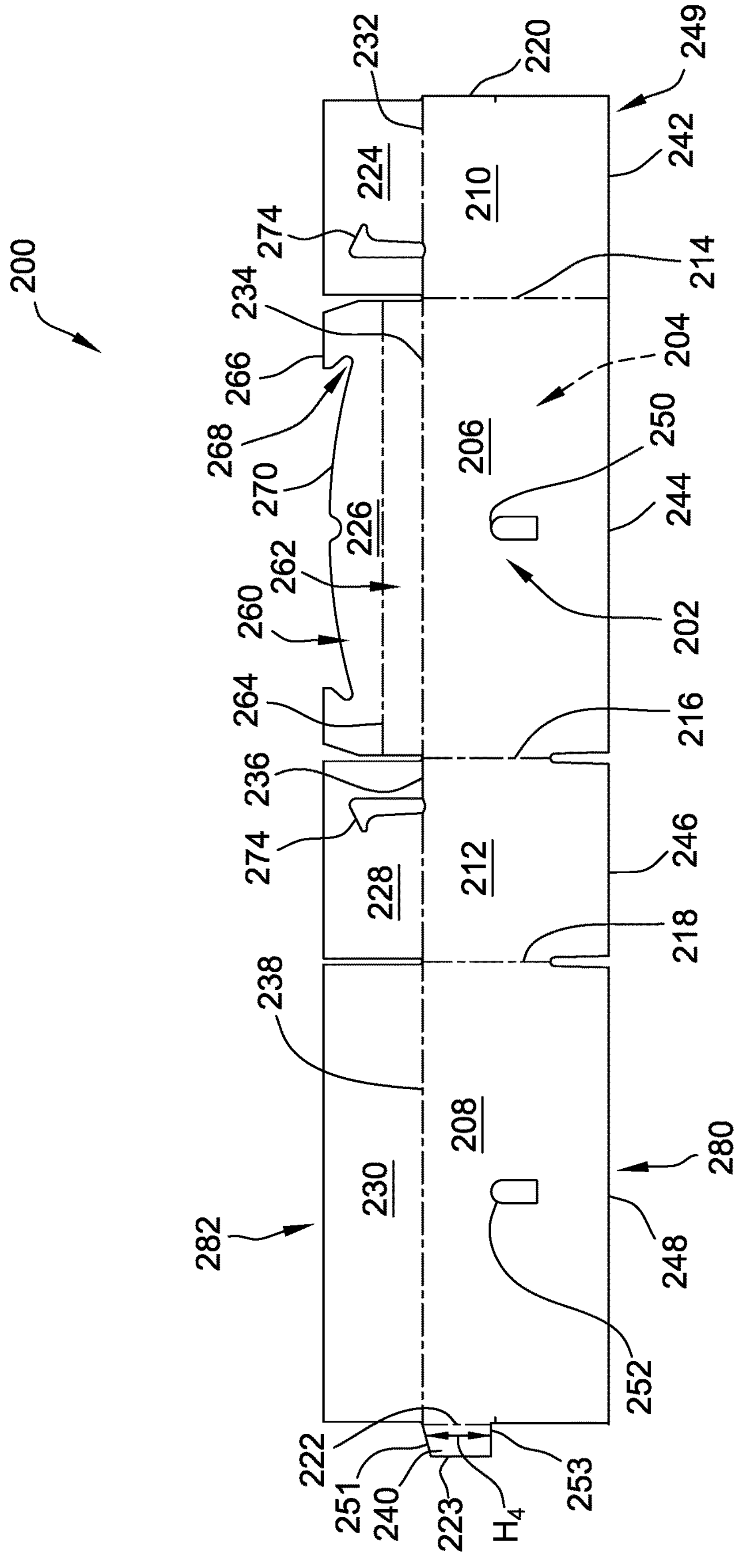
FIG. 2 is a top plan view of a cover blank of sheet material for constructing a blank assembly.

Turning now to FIG. 2, a top plan view of an example embodiment of a substantially flat cover blank 200 of sheet material that is configured to releasably couple to tray blank 100 (shown in FIG. 1) is illustrated. In the example embodiment, cover blank 200 includes an exterior surface 202 and an interior surface 204. As shown in FIG. 2, cover blank 200 extends from a leading edge 280 to a trailing edge 282 and includes a series of aligned side panels and end panels connected together by a plurality of preformed, generally parallel, fold lines. Specifically, the side panels include a first side panel 206 and a second side panel 208, and the end panels include a first end panel 210 and a second end panel 212. First end panel 210, first side panel 206, second end panel 212, and second side panel 208 are coupled together in series along preformed fold lines 214, 216, and 218, respectively. First end panel 210 extends from a first free edge 220 to fold line 214, first side panel 206 extends between first and second end panels 210 and 212 from fold line 214 to fold line 216, second end panel 212 extends between first side panel 206 and second side panel 208 from fold line 216 to fold line 218, and second side panel 208 extends from fold line 218 to a fold line 222. A glue panel 240 extends from second side panel 208 along fold line 222, to a second free edge 223.

Cover blank 200 also includes a first top flap 224 coupled to first end panel 210 along a fold line 232. A second top flap

226 is coupled to first side panel 206 along a fold line 234, a third top flap 228 is coupled to second end panel 212 along a fold line 236, and a fourth top flap 230 is coupled to second side panel 208 along a fold line 238. Fold lines 232, 234, 236, and 238 are generally parallel to one another and generally perpendicular to fold lines 214, 216, 218, and 222.

Cover blank 200 further includes a first bottom edge 242 of first end panel 210, a second bottom edge 244 of first side panel 206, a third bottom edge 246 of second end panel 212, and a fourth bottom edge 248 of second side panel 208. Bottom edges 242, 244, 246, and 248 are substantially continuous with one another and collectively define a "clean" cover bottom edge 249 of cover blank 200 (e.g., no detritus from removal of a perforated section).

In the illustrated embodiment, glue panel 240 has a height $H_4$ that extends from a top edge 251 to a bottom edge 253 of glue panel 240. Height $H_4$ does not, in the illustrated embodiment, extend a full height of cover blank 200, or even a full height of second side panel 208. Put another way, glue panel 240 extends only partially along second side panel 208, or fold line 222 extends only partially along second side panel 208. As described further herein, having glue panel 240 be "shorter" than the rest of cover blank 200 facilitates the simultaneous folding of cover blank 200 and tray blank 100 (collectively a blank assembly 300, shown in FIG. 3).

In the illustrated embodiment, free edges 220 and 223 and fold lines 214, 216, 218, and 222 are generally parallel to one another and are generally perpendicular to fold lines 232, 234, 236, and 238, and to bottom edges 242, 244, 246, and 248.

In addition, first side panel 206 includes a first cutout 250, and second side panel 208 includes a second cutout 252. First cutout 250 and second cutout 252 may have any suitable size, shape, and/or configuration. In alternative embodiments, cover blank 200 does not include cutouts 250 and/or 252.

In the illustrated embodiment, second top flap 226 includes a first portion 260 and a second portion 262, wherein second portion 262 extends from first side panel 206 along fold line 234 and first portion 260 extends from second portion 262 along a fold line 264. Fold line 264 may be generally parallel to fold line 234. Second portion 262 is generally rectangular in the illustrated embodiment, and first portion 260 includes additional features that facilitate an "easy open" container top wall. More particularly, first portion 260 includes two opposing, generally symmetrical tabs 266 that define respective channels 268. In addition, an arcuate free edge 270 of first portion 260 (opposite fold line 264) defines a recess therein. Each of first top flap 224 and third top flap 228 includes a cutout 274 defined therein. Each cutout 274 is configured to receive one of tabs 266 therein to facilitate engaging second top flap 226 with first and third top flaps 224, 228 to form a top wall of a container. In other embodiments, cover blank 200 includes top flaps configured to form a top wall of a regular slotted container (RSC) that may be closed with tape, for example, or any other adhesive.

Of course, cover blanks having shapes, sizes, and configurations different from cover blank 200 described and illustrated herein may be used in machine 1000 (shown in FIG. 4) without departing from the scope of the present invention. For example, cover blank 200 is shown as a four-sided container, but could be a six-sided container, an eight-sided container, or an N-sided container without departing from the scope of this disclosure.

Figure 3:
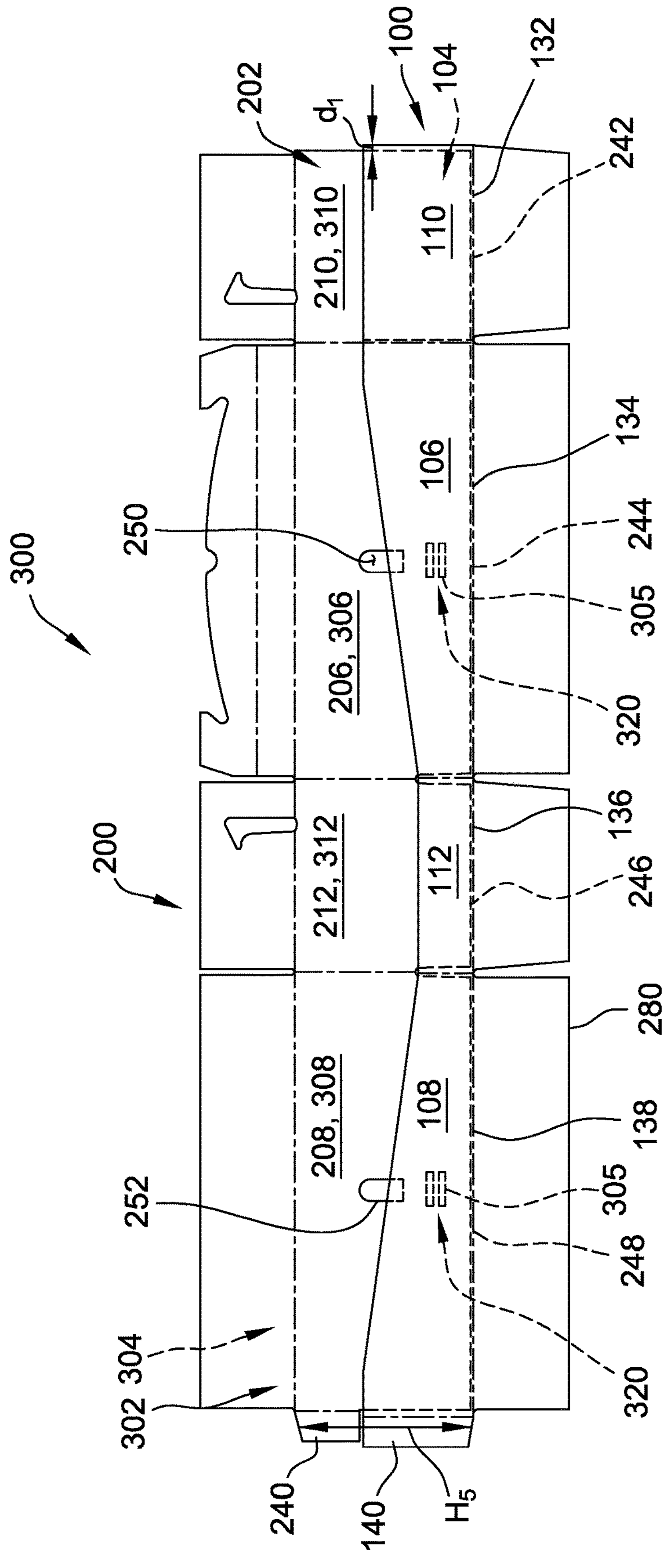
FIG. 3 is a top plan view of a blank assembly including the tray blank shown in FIG. 1 in an overlapping relationship with the cover blank shown in FIG. 2.

FIG. 3 is an exterior view of an example embodiment of a blank assembly 300, including tray blank 100 overlapping and releasably coupled to cover blank 200. To form blank assembly 300, interior surface 104 of tray blank 100 is coupled to exterior surface 202 of cover blank 200, as described further herein. More specifically, fold lines 132, 134, 136, and 138 of tray blank 100 are aligned with bottom edges 242, 244, 246, and 248 of cover blank 200, respectively, such that tray blank 100 at least partially covers exterior surface 202 of cover blank 200. Accordingly, an exterior surface 302 of blank assembly 300 includes exterior surface 102 (shown in FIG. 1) of tray blank 100 and a portion of exterior surface 202 of cover blank 200, and an interior surface 304 of blank assembly 300 includes interior surface 204 (shown in FIG. 2) of cover blank 200 and interior surface 104 of glue flap 140 and bottom flaps 124, 126, 128, and 130 (shown in FIG. 1) of tray blank 100. First free edge 120 of tray blank 100 is offset from first free edge 220 of cover blank 200 by a first predetermined offset distance $d_1$.

In the illustrated embodiment, interior surface 104 of first side panel 106 is coupled to exterior surface 202 of first side panel 206 to form a first side panel assembly 306. Similarly, interior surface 104 of second side panel 108 is coupled to exterior surface 202 of second side panel 208 to form a second side panel assembly 308. In the example embodiment, first and second side panel assemblies 306 and 308 are formed using adhesive 305 applied in a coupling region 320, coupling region 320 being between first side panel 106 and first side panel 206, and/or between second side panel 108 and second side panel 208. In one embodiment, adhesive 305 is applied adjacent to cutouts 250 and 252 (e.g., in an area of overlap of the respective side panels, such as below cutouts 250 and 252).

Blank assembly 300 also includes a first end panel assembly 310 and a second end panel assembly 312. First end panel assembly 310 includes first end panels 110 and 210. Second end panel assembly 312 includes second end panels 112 and 212. In the example embodiment, first end panel assembly 310, first side panel assembly 306, second end panel assembly 312, and second side panel assembly 308 are coupled together in series. In addition, glue panel 140 and glue panel 240 are generally aligned in a vertical direction. As shown in FIG. 3, when blank assembly 300 is formed by arranging tray blank 100 and cover blank 200 in an overlapping relationship, glue panel 140 and 240 are aligned such that a combined height $H_5$ of the two glue panels 140 and 240 corresponds to a height of second side panel 208, or to a height of the container to be formed from blank assembly 300. Notably, glue panels 140 and 240 remain separate and uncoupled from one another and, in the example embodiment, do not overlap with one another. In alternative embodiments, the machine, processes, and control system described herein can be used to form a variety of different shaped and sized blank assemblies, and is not limited to blank assembly 300.

Figure 4:
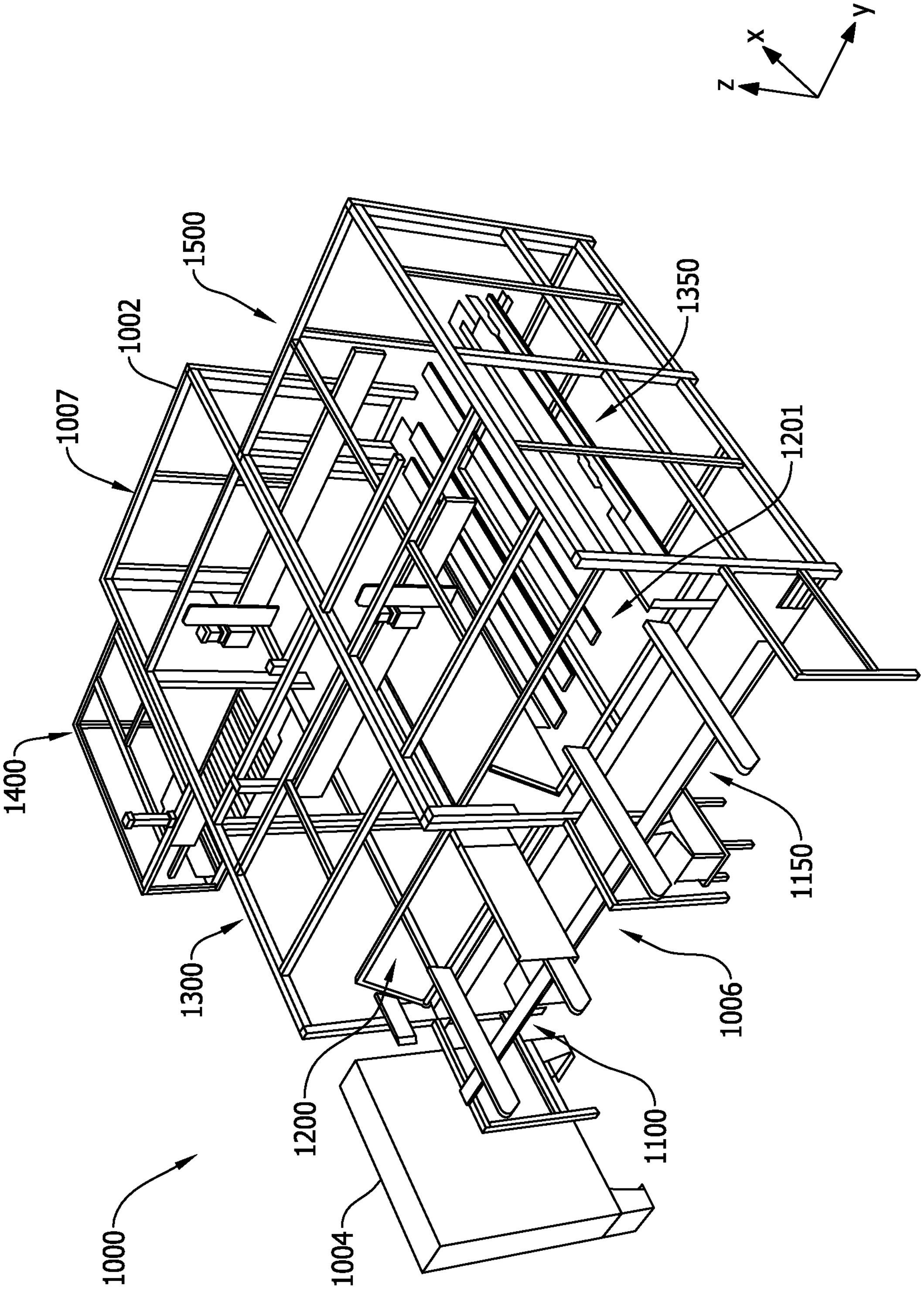
FIG. 4 is a first perspective view of an example embodiment of a machine that may be used to form a blank assembly as shown in FIG. 3.
Figure 5:
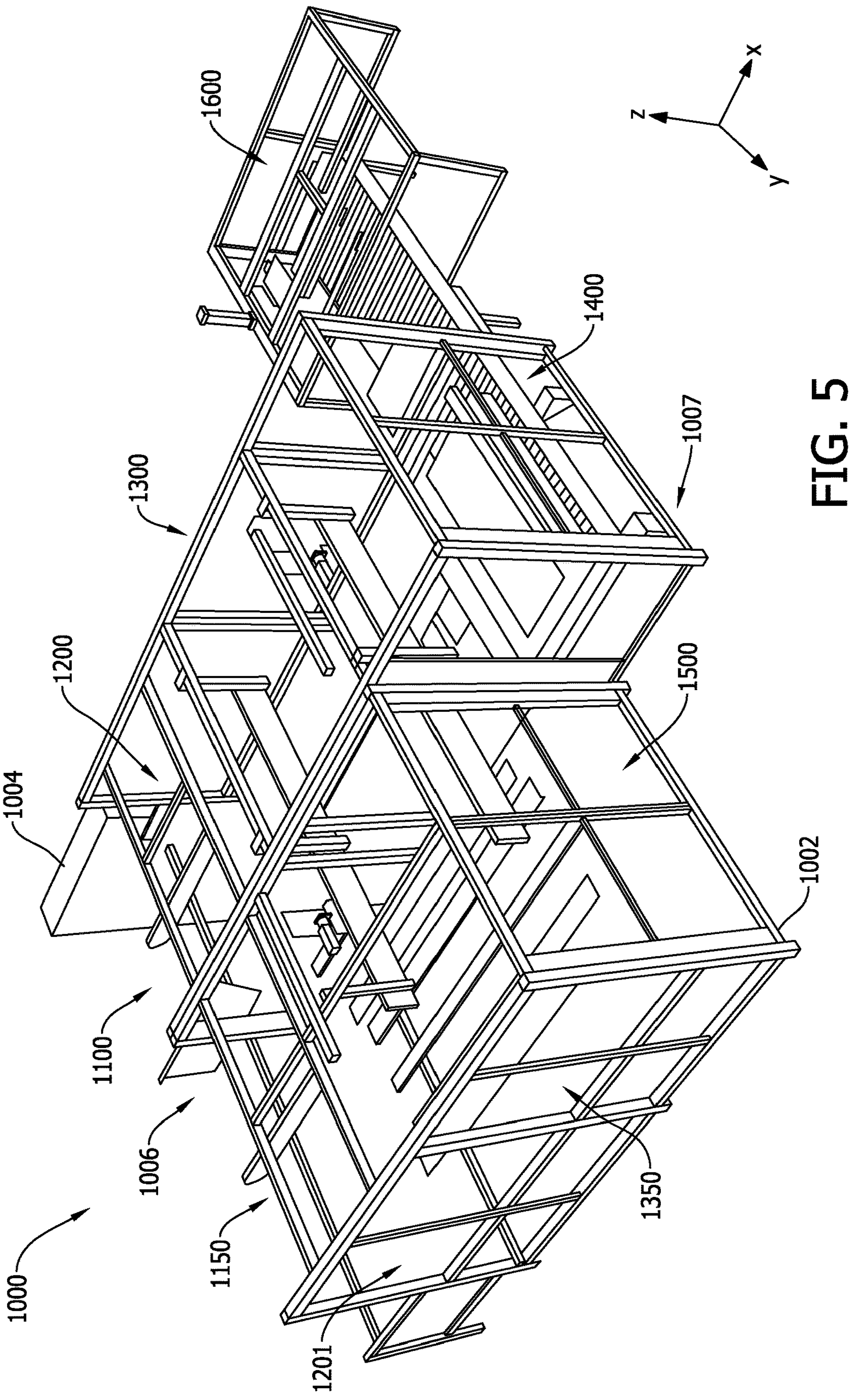
FIG. 5 is a second perspective view of the example embodiment of the machine shown in FIG. 4.

FIG. 4 is a right schematic perspective view of an example machine 1000 for forming a blank assembly, such as blank assembly 300 (shown in FIG. 3), from a tray blank, such as tray blank 100 (shown in FIG. 1) and a cover blank, such as cover blank 200 (shown in FIG. 2). While machine 1000 will be discussed hereafter with reference to forming blank assembly 300 from tray blank 100 and cover blank 200, machine 1000 may be used to form a blank assembly having any size, shape, and/or configuration from a cover blank and tray blank each having any suitable size, shape, and/or configuration without departing from the scope of the present disclosure. FIG. 5 is a left schematic perspective view of the example machine 1000 shown in FIG. 4.

Machine 1000 includes a first feed section 1100, a second feed section 1150, a first blank setup section 1200, a second blank setup section 1201, a first or cover blank indexing section 1300, a second or tray blank indexing section 1350, an outfeed section 1400, and a blank transfer section 1500 each positioned with respect to, coupled to, and/or otherwise associated with a frame 1002. A control system 1004 is coupled in operative control communication with certain components of machine 1000. In the example embodiment, actuators are used to at least one of setup tray blanks 100 and cover blanks 200 within machine 1000 and couple tray blanks 100 to cover blanks 200 to form blank assembly 300, as will be described in more detail below. The actuators may include, for example, jacks, mechanical linkages, servomechanisms, other suitable mechanical or electronic actuators, or any suitable combination thereof. As used herein, the terms "servo-actuated" and "servo-controlled" refers to any component and/or device having its movement controlled by a servomechanism. As described herein, a control system is any suitable system that controls the movement and/or timing of at least one actuator or other mechanically or electronically driven component of machine 1000.

In certain embodiments, such as, but not limited to, embodiments where at least one servomechanism is used, control system 1004 may enable an operator to change recipes or protocols by making a selection on a user interface. The recipes are computer instructions for controlling the machine to form different size boxes, different types of boxes, and/or control the output of the formed blank assemblies. The different recipes control the speed, timing, force applied, and/or other motion characteristics of the different forming components of the machine including how the components move relative to one another.

In the example embodiment, first feed section 1100 is positioned at an upstream end 1006 of machine 1000 with respect to a longitudinal or blank loading direction indicated by an arrow X. First blank setup section 1200 is positioned downstream from first feed section 1100, and cover blank indexing section 1300 is positioned downstream from first blank setup section 1200, both with respect to blank loading direction X. Outfeed section 1400 is positioned downstream from cover blank indexing section 1300 with respect to direction X, at a downstream end 1007 of machine 1000. Second feed section 1150 is located laterally parallel to first feed section 1100, in a lateral direction indicated by an arrow Y and generally perpendicular to blank loading direction X. Second blank setup section 1201 is located laterally parallel to first blank setup section 1200, and tray blank indexing section 1350 is located laterally parallel to cover blank indexing section 1300. Blank loading direction X and lateral or transverse direction Y define a generally horizontal plane, with a vertical direction Z defined perpendicular to the horizontal plane. In alternative embodiments, each of first feed section 1100, second feed section 1150, first blank setup section 1200, second blank set up section 1201, cover blank indexing section 1300, tray blank indexing section 1350, outfeed section 1400, and blank transfer section 1500 is positioned with respect to others of first feed section 1100, second feed section 1150, first blank setup section 1200, second blank set up section 1201, cover blank indexing section 1300, tray blank indexing section 1350, outfeed section 1400, and blank transfer section 1500 in any suitable location.

In the example embodiment, a conveyor 1600 with stacks of blank assemblies is positioned with respect to machine 1000 downstream from outfeed section 1400 with respect to transverse direction Y. In alternative embodiments, conveyor 1600 is positioned with respect to machine 1000 in any suitable location. For example, but not by way of limitation, conveyor 1600 is located at one or more locations remote to machine 1000.

Figure 6:
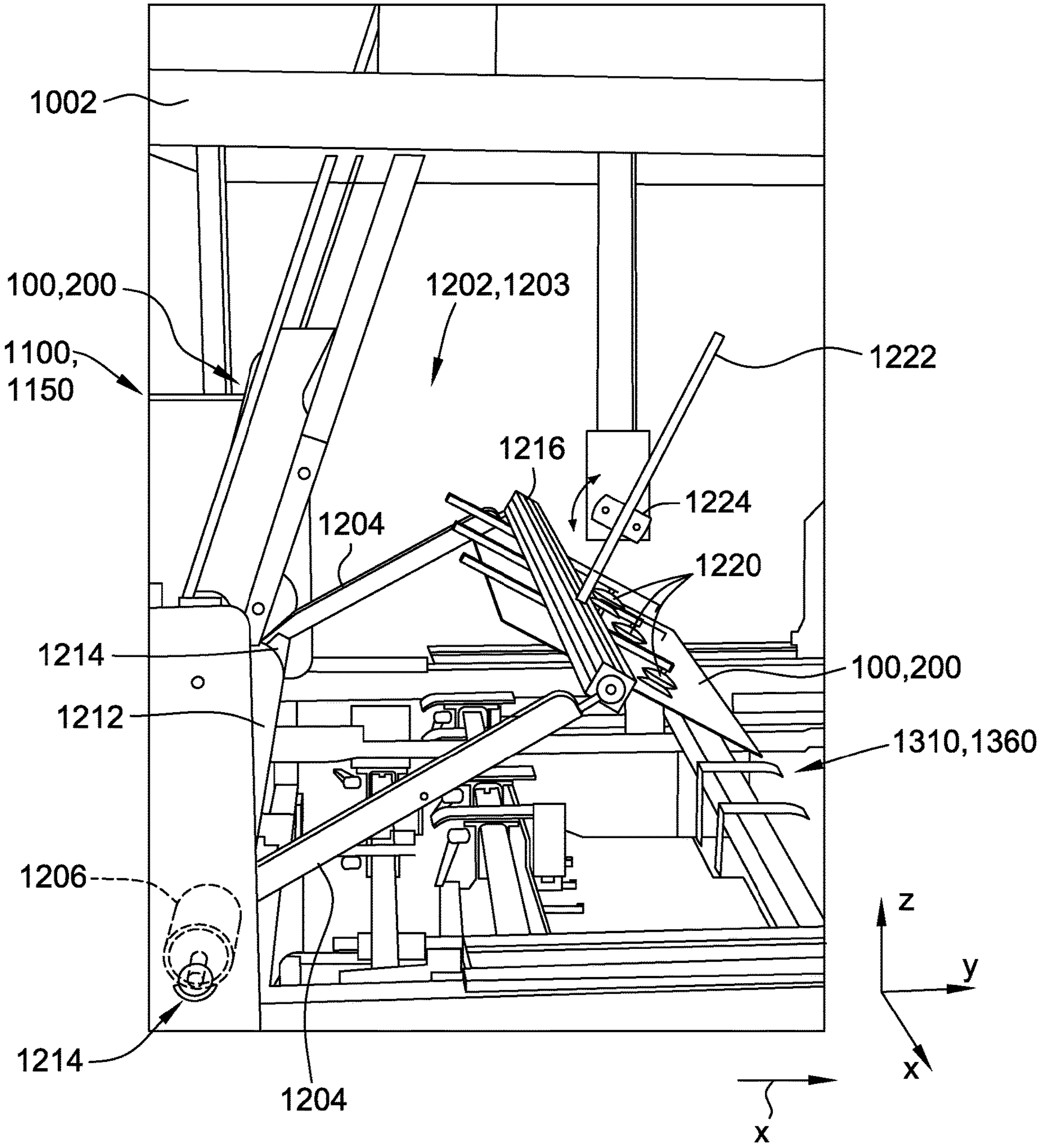
FIG. 6 is a perspective view of an example feed section and example blank setup section of the machine shown in FIGS. 4 and 5.

FIG. 6 is a schematic perspective view of an example embodiment of first feed section 1100 or second feed section 1150, and an example embodiment of first blank setup section 1200 or second blank setup section 1201 of machine 1000. First feed section 1100 and second feed section 1150 and first blank setup section 1200 and second blank setup section 1201 act in substantially the same way except that first feed section 1100 is configured to receive a plurality of cover blanks 200, and second feed section 1150 is configured to receive a plurality of tray blanks 100. In the example embodiment, feed sections 1100 and 1150 are magazine feed sections that include a plurality of powered drives 1102 (shown in FIG. 4), respectively. For example, each magazine drive 1102 is a belt conveyor. Magazine drives 1102 are configured to move cover blanks 200 and tray blanks 100 towards blank setup sections 1200 and 1201, respectively. Additionally or alternatively, feed sections 1100 and 1150 include any suitable structures that enable feed sections 1100 and 1150 to function as described herein. In the example embodiment, cover blanks 200 (shown in FIG. 2) are oriented generally in the vertical direction Z within first feed section 1100, such that leading edge 280 of each cover blank 200 is positioned against drives 1102 and interior surface 204 of each cover blank 200 faces first blank setup section 1200. Further in the example embodiment, tray blanks 100 (shown in FIG. 1) are oriented generally in the vertical Z direction within second feed section 1150, such that leading edge 160 of each tray blank 100 is positioned against drives 1102 and interior surface 104 of each tray blank 100 faces second blank setup section 1201. In alternative embodiments, feed sections 1100 and 1150 are configured to present cover blanks 200 and tray blanks 100, respectively, in another suitable orientation, such as, but not limited to, a generally horizontal configuration. In the example embodiment, feed sections 1100 and 1150 include at least one alignment device (not shown) such as, but not limited to, a stack presser, to facilitate justifying and/or aligning cover blanks 200 and tray blanks 100 in the magazines of feed sections 1100 and 1150.

In the example embodiment, first blank setup section 1200 includes a first blank setup assembly 1202 coupled to, or otherwise associated with, frame 1002 proximate first feed section 1100. Further in the example embodiment, second blank setup section 1201 includes a second blank setup assembly 1203, substantially similar to first blank setup assembly 1202. First blank setup assembly 1202 is configured to extract one of cover blanks 200 from first feed section 1100 and position the extracted cover blank 200 on a first deck 1310, as described further herein with respect to FIG. 7. Second blank setup assembly 1203 is configured to extract one of tray blanks 100 from second feed section 1150 and position the extracted tray blank 100 on a second deck 1360, parallel to first deck 1310 and described further herein with respect to FIG. 8. More specifically, blank setup assemblies 1202 and 1203 are configured to position each extracted cover blank 200 and tray blank 100, respectively, on a first end 1311 of first deck 1310 and a first end 1361 of second deck 1360, respectively, such that leading edge 280 of cover blank 200 and leading edge 160 of tray blank 100 is aligned substantially at a predetermined location along decks 1310 and 1360 with respect to the X direction, and first free edge 220 of cover blank 200 and first free edge 120 of tray blank 100 are aligned substantially at a predetermined location along decks 1310 and 1360 with respect to the Y direction.

In the example embodiment, blank setup assemblies 1202 and 1203 include a drive shaft 1212 supported and aligned generally parallel to the transverse Y direction by at least one bearing 1214. Drive shaft 1212 is operably coupled to a suitable actuator 1206 for bi-directional rotation about its shaft axis. For example, actuator 1206 includes at least one of a hydraulic jack, an air cylinder, a mechanical linkage, a servomechanism, and another suitable mechanical or electronic actuator. A pair of arms 1204 extend from opposite ends of drive shaft 1212, and rotate with drive shaft 1212. A pick-up bar 1216 is aligned parallel to drive shaft 1212, and is coupled between arms 1204 for free rotation about its bar axis. A plurality of vacuum suction cups 1220 are fixedly coupled to pick-up bar 1216. Each suction cup 1220 is operably coupled to a respective independent vacuum generator (not shown) for selectively providing suction to selectively attach suction cups 1220 to cover blank 200 and tray blank 100 presented in feed sections 1100 and 1150.

In alternative embodiments, at least some suction cups 1220 are coupled to a common vacuum generator. Further in the example embodiment, a respective guide rod 1222 is fixedly coupled to each end of pick-up bar 1216. Guide rod 1222 is slidably coupled through an aperture in a pivot block 1224. In turn, pivot block 1224 is pivotably coupled to and/or otherwise associated with frame 1002 for rotation about an axis parallel to drive shaft 1212. In alternative embodiments, blank setup assemblies 1202 and 1203 include any suitable additional or alternative components that enable blank setup assemblies 1202 and 1203 to function as described herein.

In operation, blank setup assemblies 1202 and 1203 are controlled, commanded, and/or instructed to position suction cups 1220 to facilitate extracting cover blank 200 and tray blank 100, respectively, from feed sections 1100 and 1150 and placing cover blank 200 on first deck 1310 and tray blank 100 on second deck 1360, respectively. More specifically, in the example embodiment, actuator 1206 is controlled, commanded, and/or instructed to rotate drive shaft 1212 in a first direction (clockwise in the view of FIG. 6). As arms 1204 rotate with drive shaft 1212, guide rods 1222 and pivot blocks 1224 cooperate to orient pick-up bar 1216 such that suction cups 1220 are positioned in sealing contact with cover blank 200 or tray blank 100, which is presented generally perpendicular to blank loading direction X in first feed section 1100 or second feed section 1150. Actuator 1206 is then controlled, commanded, and/or instructed to rotate drive shaft 1212 in a second, opposite direction (counterclockwise in the view of FIG. 6). As arms 1204 rotate with drive shaft 1212, activated suction cups 1220 extract cover blank 200 or tray blank 100 from feed section 1100 or 1150, respectively. Moreover, guide rods 1222 and pivot blocks 1224 cooperate to rotate pick-up bar 1216 such that cover blank 200 or tray blank 100 is oriented generally perpendicular to vertical direction Z as pick-up bar 1216 approaches first deck 1310 or second deck 1360. Finally, vacuum pressure through suction cups 1220 is controlled, commanded, and/or instructed to be de-activated, depositing cover blank 200 on first deck 1310 or tray blank 100 on second deck 1360 such that respective leading edges 280 and 160 and respective first free edges 220 and 120 are aligned at substantially the predetermined location along the corresponding deck 1310 or 1360 with respect to the X and Y direction, respectively, and respective exterior surface 202 or 102 is facing upward. In certain embodiments, actuator 1206 is then controlled, commanded, and/or instructed to rotate drive shaft 1212 in the first direction to provide clearance for other operations of machine 1000 proximate decks 1310 and 1360. For example, blank setup assemblies 1202 and 1203 are rotated to extract another cover blank 200 and tray blank 100 and/or to pause in a neutral position to provide clearance for other operations of machine 1000 proximate decks 1310 and 1360, as will be described herein. In alternative embodiments, blank setup assemblies 1202 and 1203 are operated in any suitable additional or alternative fashion that enable blank setup assemblies 1202 and 1203 to function as described herein.

Figure 7:
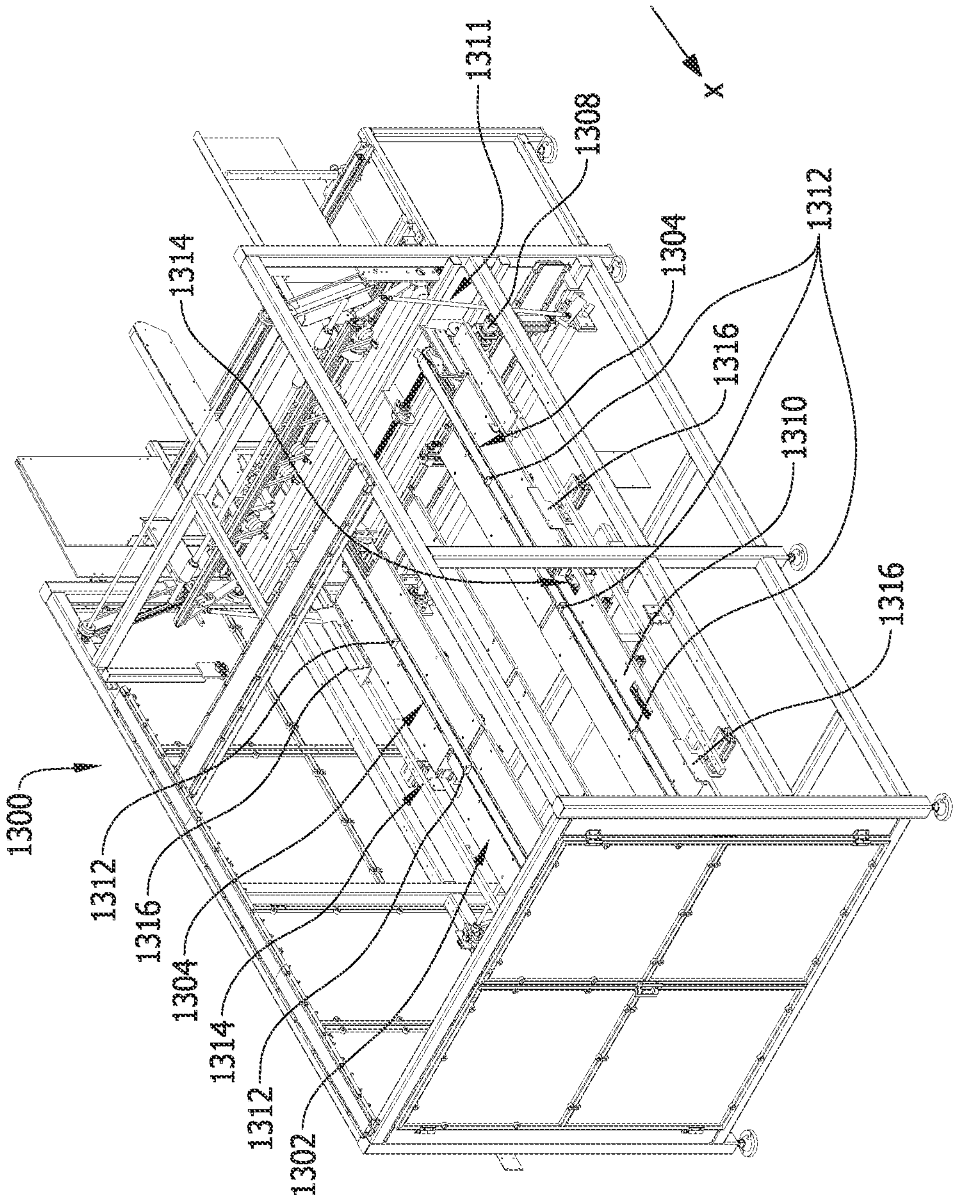
FIG. 7 is a perspective view of an example forwarding assembly of a first or cover blank indexing section of the machine shown in FIGS. 4 and 5.

FIG. 7 is a schematic perspective view of cover blank indexing section 1300 including a forwarding assembly 1302 operably coupled to an actuator 1308 for bi-directional translation parallel to the X direction through cover blank indexing section 1300. For example, actuator 1308 includes at least one of a hydraulic jack, an air cylinder, a mechanical linkage, a servomechanism, and another suitable mechanical or electronic actuator. First blank setup assembly 1202 is configured to position cover blanks 200 proximate first end 1311 of first deck 1310. First deck 1310 is configured to support cover blank 200 in a generally horizontal position (i.e., generally parallel to the X-Y plane) in cover blank indexing section 1300 as tray blanks 100 are coupled to cover blanks 200, as described further herein.

In the example embodiment, forwarding assembly 1302 includes a pair of feed chains 1304 with lugs 1312 extending therefrom. Lugs 1312 are spaced apart along feed chains 1304, to advance cover blanks 200 along first deck 1310 and to maintain the desired amount of space between adjacent cover blanks 200. In one embodiment, lug spacing is dependent on a size of cover blank 200 and, in an alternative embodiment, lugs 1312 are at a predetermined spacing and a size of cover blank 200 is entered into control system 1004. Lugs 1312 are configured to move cover blanks 200 and blank assemblies 300 through cover blank indexing section 1300 such that lugs 1312 are generally downstream from trailing edge 282 of cover blanks 200. Specifically, to advance cover blanks 200 along first deck 1310, actuator 1308 coupled to chains 1304 is actuated (e.g., by a control signal from control system 1004) to control chains 1304. Chains 1304 are advanced, and lugs 1312 contact trailing edge 282 of cover blank 200. In the example embodiment, there are two chains 1304, each with one lug 1312 contacting trailing edge 282 of cover blank 200 such that two lugs 1312 are contacting trailing edge 282 of cover blank 200. In other embodiments, there are three or more chains 1304, each with one or more lugs 1312 contacting trailing edge 282 of cover blank 200 such that three or more lugs 1312 are contacting trailing edge 282 of cover blank 200.

Forwarding assembly 1302 further includes a plurality of stoppers 1314 and a plurality of side rails 1316. Stoppers 1314 are configured to be activated to stop cover blanks 200, as described below. Side rails 1316 are configured to precisely align cover blanks 200 in assembly zones 2002 and 2006 (shown in FIG. 14), described below. Side rails 1316 are controlled by control system 1004 to translate outwards from cover blank 200 before tray blank 100 is coupled to cover blank 200, as to not interfere with the coupling of the blanks. In the example embodiment, there are two stoppers in each assembly zone 2002 and 2006. In other embodiments, there are more than two stoppers in each assembly zone 2002 and 2006 to more precisely align cover blanks 200 before tray blanks 100 are coupled to respective cover blanks 200.

Figure 8:
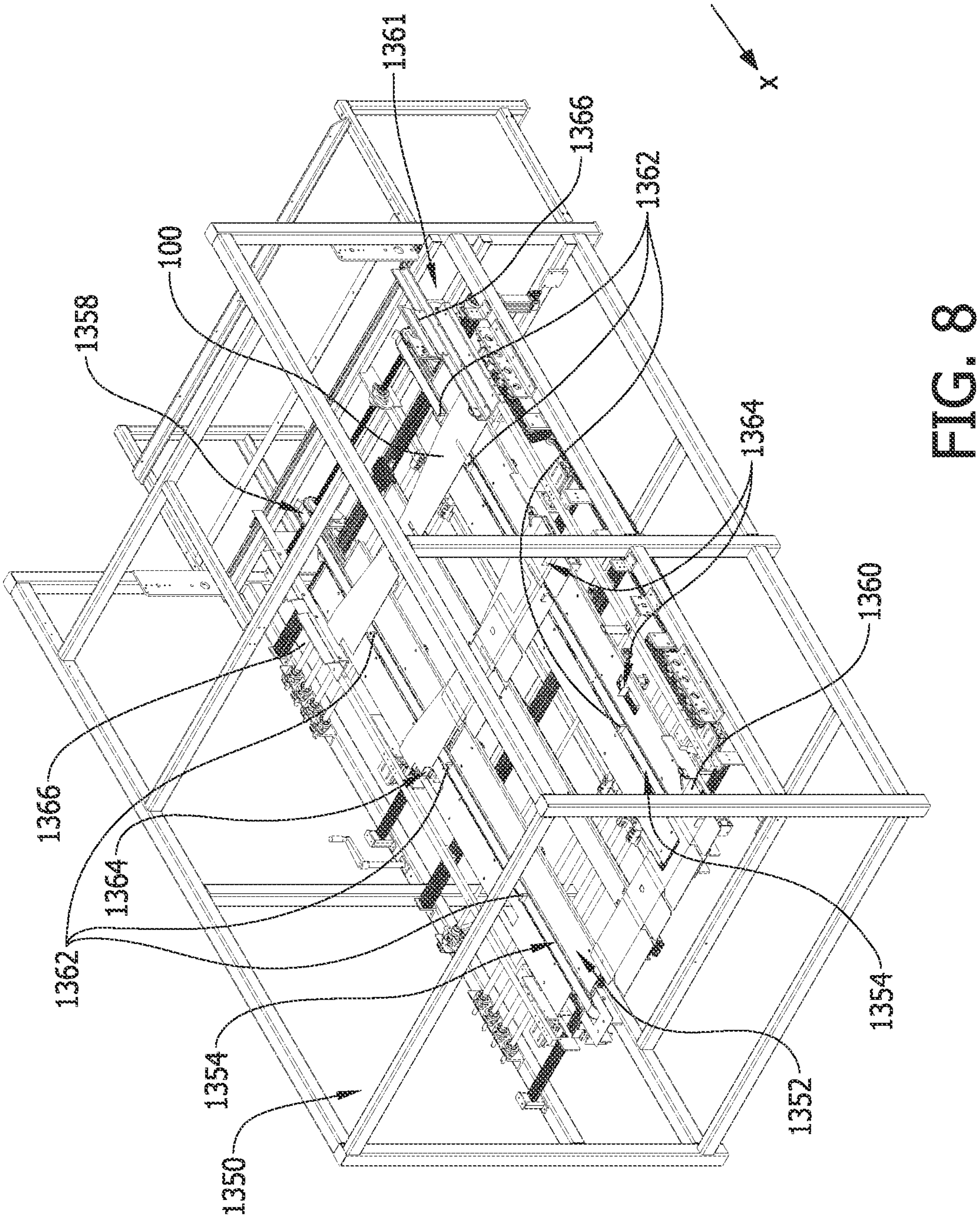
FIG. 8 is a perspective view of an example forwarding assembly of a second or tray blank indexing section of the machine shown in FIGS. 4 and 5.

FIG. 8 is a schematic perspective view of tray blank indexing section 1350 including a forwarding assembly 1352 operably coupled to an actuator 1358 for bi-directional translation parallel to the X direction through tray blank indexing section 1350. For example, actuator 1358 includes at least one of a hydraulic jack, an air cylinder, a mechanical linkage, a servomechanism, and another suitable mechanical or electronic actuator. Second blank setup assembly 1203 is configured to position tray blanks 100 proximate first end 1361 of first deck 1310. Second deck 1360 is configured to support tray blank 100 in a generally horizontal position (i.e., generally parallel to the X-Y plane) in tray blank indexing section 1350 as tray blanks 100 are removed from second deck 1360 by blank transfer assemblies 1550 and 1552 (shown in FIG. 11) to be coupled to cover blanks 200, as described herein.

In the example embodiment, like forwarding assembly 1302 (shown in FIG. 7), forwarding assembly 1352 includes a pair of feed chains 1354 with lugs 1362 extending therefrom.

Lugs 1362 are spaced apart along feed chains 1354, to advance tray blanks 100 along second deck 1360 and to maintain the desired amount of space between adjacent tray blanks 100. In one embodiment, lug spacing is dependent on a size of tray blank 100 and, in an alternative embodiment, lugs 1362 are at a predetermined spacing and a size of tray blank 100 is entered into control system 1004. Lugs 1362 are configured to move tray blanks 100 through tray blank indexing section 1350 such that lugs 1362 are generally downstream from trailing edge 162 of tray blanks 100. In the example embodiment, lugs 1362 of chains 1354 are offset from one another in the horizontal direction Y generally transverse to blank loading direction X because tray blanks 100 are tapered along trailing edge 162. That is, for example, one lug 1362 may be in contact with horizontal portion 155 (shown in FIG. 1) of tray blank 100 while the other lug 1362 is in contact with angled portion 158 (shown in FIG. 1) of tray blank 100 so that each lug 1362 is in contact with trailing edge 162 of tray blank 100. To advance tray blanks 100 along second deck 1360, actuator 1358 coupled to chains 1354 is actuated (e.g., by a control signal from control system 1004) to control chains 1354. Chains 1354 are advanced, and lugs 1362 contact trailing edge 162 of tray blank 100. In the example embodiment, there are two chains 1354, each with one lug 1362 contacting trailing edge 162 of tray blank 100 such that two lugs 1362 are contacting trailing edge 162 of tray blank 200. In other embodiments, there are three or more chains 1354, each with one or more lugs 1362 contacting trailing edge 162 of tray blank 100 such that three or more lugs 1362 are contacting trailing edge 162 of tray blank 100.

Forwarding assembly 1352, like forwarding assembly 1302, further includes a plurality of stoppers 1364 and a plurality of side rails 1366. Stoppers 1364 are configured to be activated to stop tray blanks 100 and side rails 1516 are configured to precisely align tray blanks 100 in pick-up zones 2003 and 2007 (shown in FIG. 14), described in detail below. Specifically, stoppers 1364 are controlled using control system 1004 to activate or translate upwards in response to a precisely timed control signal. Lugs 1362 advance tray blank 100 into contact with stoppers 1364. As such, stoppers 1364 and side rails 1366 precisely align tray blanks 100 on second deck 1360 for blank transfer assemblies 1550 and 1552 (shown in FIG. 11) to pick up tray blanks 100, as described in detail below. Stoppers 1364 are subsequently controlled to "deactivate" or translate downwards after blank transfer assemblies 1550 and 1552 pick-up tray blanks 100 in order to allow lugs 1362 to move more tray blanks 100 along tray blank indexing section 1350. Side rails 1366 are controlled to translate outwards from tray blank 100 before tray blank 100 is picked up by blank transfer assemblies 1550 and 1552. In the example embodiment, there are two stoppers in each assembly zone 2002 and 2006. In other embodiments, there are more than two stoppers in each assembly zone 2002 and 2006 to more precisely align tray blanks 100 before tray blanks 100 are coupled to respective cover blanks 200.

Figure 9:
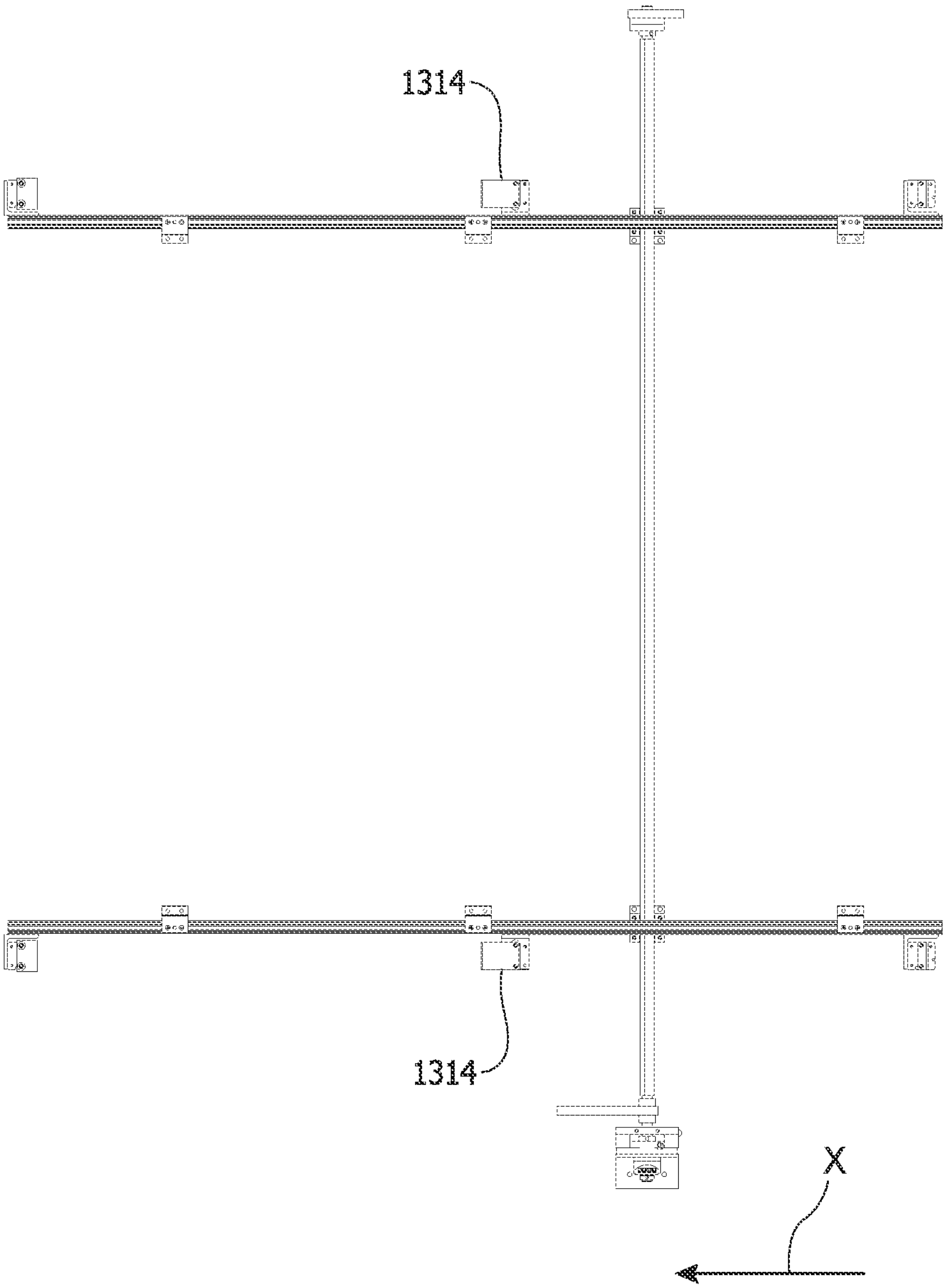
FIG. 9 is a top view of example stoppers of the first or second indexing sections of the machine shown in FIGS. 7 and 8.
Figure 10:
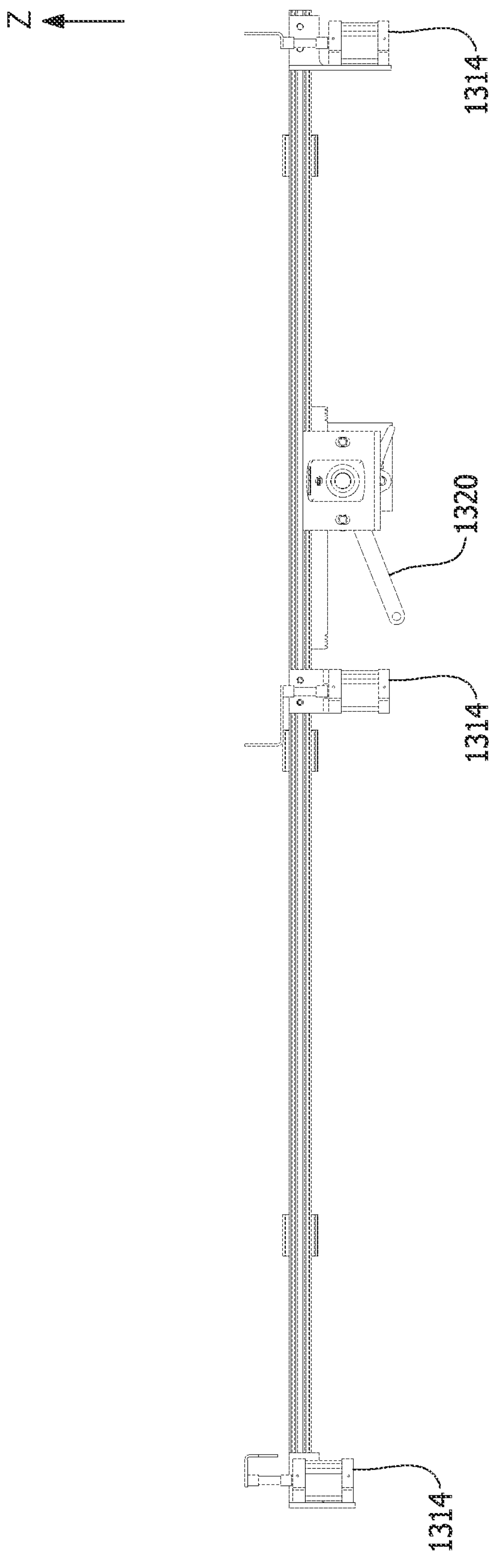
FIG. 10 is a side view of the example stoppers shown in FIG. 9.

FIG. 9 is a top view of stoppers 1314, 1364 suitable for use with cover blank indexing section 1300 or tray blank indexing section 1350 of machine 1000. Only stoppers 1314 of cover blank indexing section 1300 are described for ease of description. FIG. 10 is a side view of stoppers 1314 shown in FIG. 9. In the illustrated embodiment, two stoppers are shown. As described above, in other embodiments, there are three or more stoppers. In the illustrated embodiment, actuator 1320 is configured to move stoppers 1314 upwards in a direction generally parallel to the Z direction and downwards in a direction generally opposite the upwards direction. In the example embodiment, actuator 1320 is a guide spur gear. As described above, stoppers 1314 are configured to be activated to stop cover blanks 200. Specifically, stoppers 1314 are controlled by actuator 1320 using control system 1004 to activate or translate upwards in response to a precisely timed control signal. Lugs 1312 (shown in FIG. 7) advance cover blank 200 into contact with stoppers 1314. As such, stoppers 1314 precisely align cover blanks 200 on first deck 1310 for blank transfer assemblies 1550 and 1552 (shown in FIG. 11) to couple tray blanks 100 to cover blanks 200, as described in detail below. Stoppers 1314 are subsequently controlled to translate quickly downwards before blank transfer assemblies 1550 and 1552 couple tray blanks 100 to cover blanks 200, as to not interfere with the coupling of tray blank 100 to cover blank 200. That is, stoppers 1314 translate downwards right before blank transfer assemblies 1550 and 1552 coupled tray blank 100 to cover blank 200 because tray blank 100 overlies the area where stoppers 1314 are raised once tray blank 100 is coupled to cover blank 200. Stoppers 1314 are not translated upwards during the coupling of tray blank 100 to cover blank 200 because stoppers 1314 could inhibit tray blank 100 from being coupled to cover blank 200. After tray blank 100 is coupled to cover blank 200, lugs 1312 continue moving cover blanks 200 and/or blank assemblies 300 through cover blank indexing section 1300.

Figure 11:
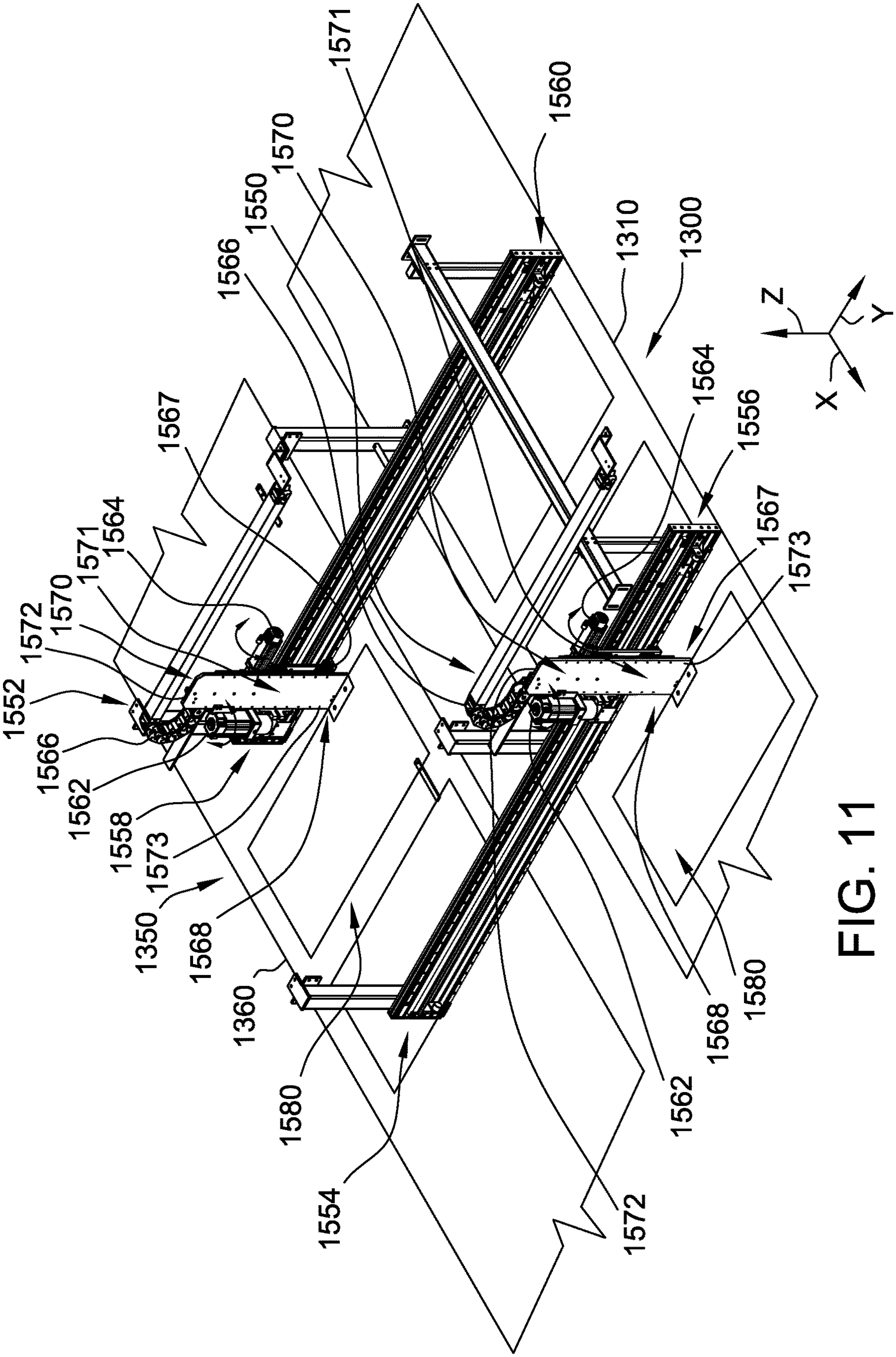
FIG. 11 is a perspective view of example blank transfer assemblies for use with the machine shown in FIGS. 4 and 5 in first, operationally offset positions.
Figure 12:
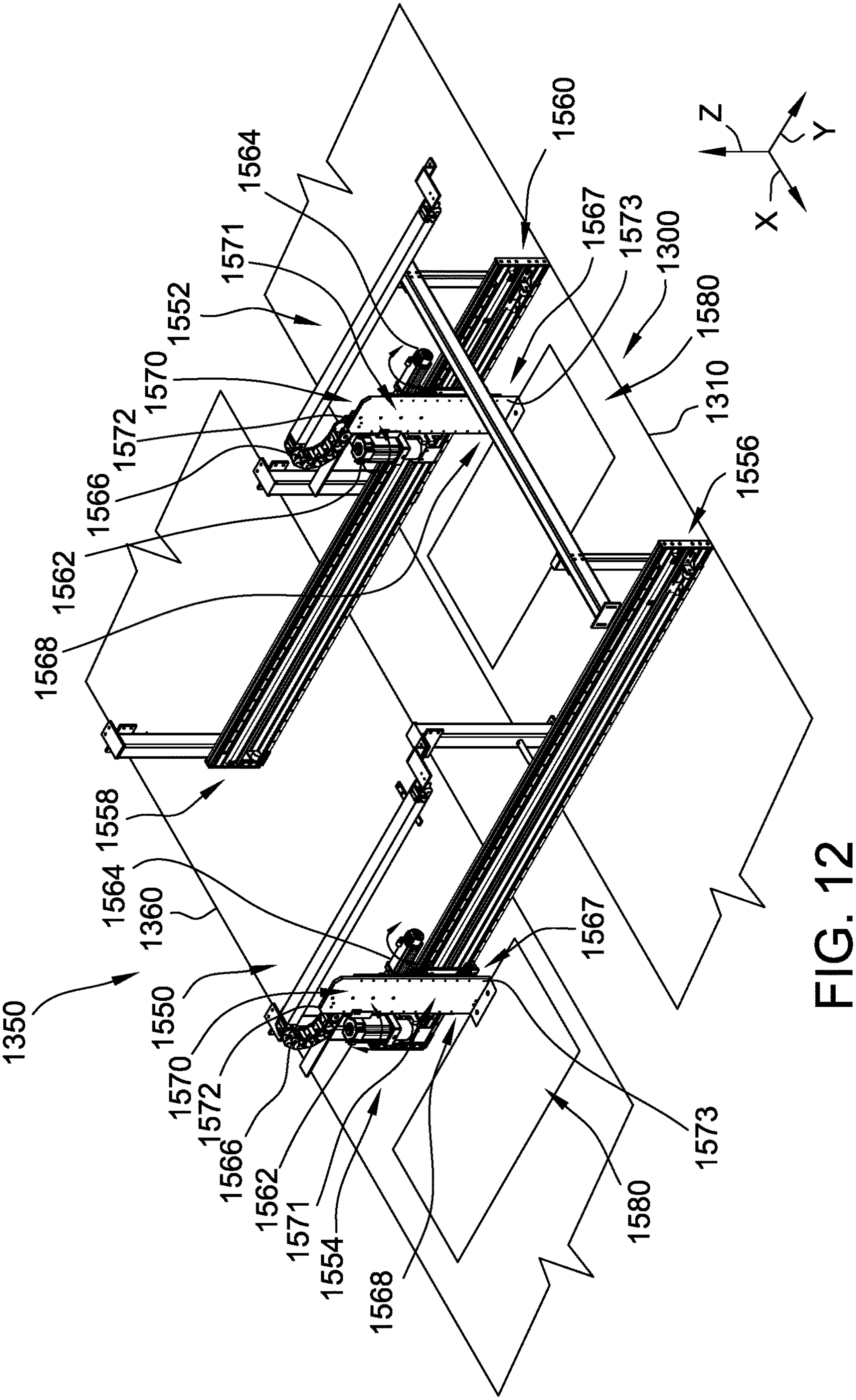
FIG. 12 is a perspective view of the blank transfer assemblies shown in FIG. 11 in second, operationally offset positions.

FIGS. 11 and 12 are schematic perspective views of blank transfer section 1500, including first and second blank transfer assemblies 1550 and 1552, illustrated in relation to cover blank and tray blank indexing sections 1300 and 1350. As described above, cover blank indexing section 1300 includes first deck 1310, and tray blank indexing section 1350 includes second deck 1360. Each blank transfer assembly 1550, 1552 is configured to pick up a tray blank 100 from second deck 1360 and deposit tray blank 100 in an at least partially overlying relationship with a cover blank 200 positioned on first deck 1310. Blank transfer assemblies 1550 and 1552 are configured to perform in the same manner, operationally offset from one another.

In the example embodiment, first blank transfer assembly 1550 extends generally in transverse direction Y from a first end 1554 to an opposite second end 1556. More specifically, first end 1554 is positioned over tray blank indexing section 1350, with respect to vertical direction Z, and proximate second deck 1360, and second end 1556 is positioned over cover blank indexing section 1300, with respect to vertical direction Z, and proximate deck 1310. Second blank transfer assembly 1552 extends generally in transverse direction Y from a third end 1558 (i.e., a first end 1558 of second blank transfer assembly 1552) to a fourth end 1560 (i.e., a second end 1560 of second blank transfer assembly 1552). Second blank transfer assembly 1552 is positioned upstream from first blank transfer assembly 1550 of machine 1000 with respect to blank loading direction X. Third end 1558 is positioned downstream from first end 1554, and fourth end 1560 is positioned downstream from second end 1556, both with respect to blank loading direction X. First blank transfer assembly 1550 and second blank transfer assembly 1552 operate in substantially the same way except that first blank transfer assembly 1550 and second blank transfer assembly 1552 are operationally offset from one another, as shown in FIGS. 11 and 12 and as described in detail below with regard to FIGS. 17A-17E.

First blank transfer assembly 1550 includes a gantry 1570 operable for bi-directional translation between first end 1554 and second end 1556. In the example embodiment, a pick-up assembly 1580 is coupled to gantry 1570 for bi-directional translation with respect to gantry 1570 generally parallel to the vertical Z direction. Pick-up assembly 1580 is operable to (i) pick tray blank 100 from second deck 1360 when gantry 1570 is positioned proximate first end 1554, (ii) transport tray blank 100 from proximate first end 1554 to proximate second end 1556, (iii) deposit tray blank 100 in the at least partially overlying relationship with cover blank 200 positioned on first deck 1310 when gantry 1720 is positioned proximate second end 1556, and (iv) compress tray blank 100 onto cover blank 200 such that blank assembly 300 (shown in FIG. 3) is formed on first deck 1310. Second blank transfer assembly 1552 includes the same elements and functions in an equivalent manner.

Blank transfer assemblies 1550 and 1552 include a lift arm 1571 coupled to gantry 1570 for bi-directional translation relative to gantry 1570 in the Z direction. Lift arm 1571 extends generally in the Z direction from a first end 1572 to a second end 1573, and pick-up assembly 1580 is coupled to lift arm 1571 at second end 1573. In addition, a first servomechanism 1562 operable for bi-directional rotation is coupled proximate first end 1572 of gantry 1570, and a second servomechanism 1564 operable for bi-directional rotation is also coupled proximate first end 1572 of gantry 1570. Each servomechanism 1562 and 1564 is coupled in driving relationship with an open loop belt 1566 that extends from a first end 1567 to a second end 1568. Each of belt first end 1567 and belt second end 1568 is coupled to lift arm 1571 proximate second end 1573.

Belt 1566 is looped in a circuit, in a counterclockwise direction in the view of FIG. 12, from first end 1572 of lift arm 1571 adjacent pick-up assembly 1580, around second servomechanism 1564, around first servomechanism 1562, to second end 1573 of lift arm 1571 and back to first end 1572 of lift arm 1571, such that lift arm 1571 is carried by belt 1566. Thus, when each servomechanism 1562 and 1564 rotates in a first direction (counterclockwise in the view of FIG. 11) at a substantially identical speed, gantry 1570 translates in the Y direction with respect to first blank transfer assembly 1550 and lift arm 1571 does not substantially translate with respect to gantry 1570; when each servomechanism 1562 and 1564 rotates in a second direction (clockwise in the view of FIG. 11) opposite the first direction at a substantially identical speed, gantry 1570 translates opposite the Y direction with respect to first blank transfer assembly 1550 and lift arm 1571 does not substantially translate with respect to gantry 1570; when first servomechanism 1562 rotates in the second direction and second servomechanism 1564 rotates in the first direction at a substantially identical speed, gantry 1570 does not substantially translate with respect to first blank transfer assembly 1550 and lift arm 1571 (and, hence, pick-up assembly 1580) translates with respect to gantry 1570 in the Z direction; and when first servomechanism 1562 rotates in the first direction and second servomechanism 1564 rotates in the second direction at a substantially identical speed, gantry 1570 does not substantially translate with respect to first blank transfer assembly 1550 and lift arm 1571 (and, hence, pick-up assembly 1580) translates with respect to gantry 1570 opposite the Z direction. In alternative embodiments, first blank transfer assembly 1550 includes any suitable additional or alternative structure that enables blank transfer section 1500 to function as described herein. For example, blank transfer assemblies 1550 and 1552 may be dual axis gear rack systems. An example of another blank transfer assembly is described in the co-pending U.S. patent application filed Apr. 10, 2018, entitled "Machine and Methods for Attaching a Retaining Web to a Container Blank,", which is hereby incorporated by reference herein.

In the example embodiment, servomechanisms 1562 and 1564 are matched and geared electronically to facilitate operation at identical rotational speed, acceleration, and deceleration. For purposes of this disclosure, the operation of servomechanisms 1562 and 1564 at substantially identical speeds includes operation of servomechanisms 1562 and 1564 with a slight variance in angular speed, acceleration, and/or deceleration to facilitate slightly curvilinear motion of pick-up assembly 1580 relative to frame 1002 to, for example, facilitate a smooth transition from Y-direction translation to Z-direction translation, and vice versa, of pick-up assembly 1580 relative to frame 1002.

Figure 13:
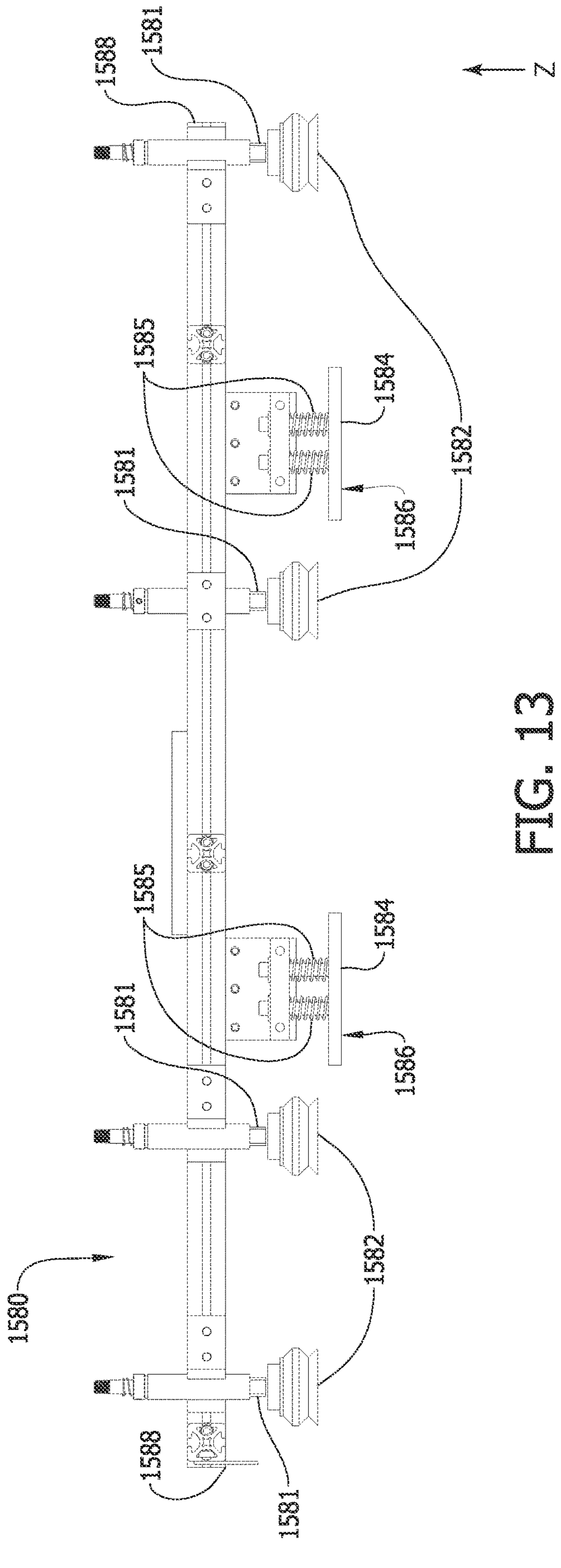
FIG. 13 is a front view of an example pick-up assembly for use with the blank transfer assemblies shown in FIGS. 11 and 12.

FIG. 13 is a front view of pick-up assembly 1580 that is coupled to lift arm 1571 at second end 1573 of lift arm 1571 (shown in FIG. 11). Pick-up assembly 1580 includes a plurality of vacuum suction cups 1582 and compression members 1584. Vacuum suction cups 1582 are coupled to pick-up assembly 1580. In the example embodiment, each suction cup 1582 is coupled to pick-up assembly 1580 via a coupling member 1581 that is substantially rigid with respect to the Z direction. In alternative embodiments, each suction cup 1582 is coupled to pick-up assembly 1580 via a spring having a first stiffness and configured for compression in the Z direction. Each suction cup 1582 is operably coupled to a respective independent vacuum generator (not shown) for selectively providing suction to selectively attach suction cups 1582 to tray blank 100 presented on second deck 1360 (shown in FIG. 11). In alternative embodiments, at least some suction cups 1582 are coupled to a common vacuum generator.

In the example embodiment, each compression member 1584 is coupled to pick-up assembly 1580 via at least one spring 1585. Each compression member spring 1585 is configured for compression in the Z direction. Compression members 1584 are configured to compress at least a portion of coupling region 320 (shown in FIG. 3) of tray blank 100 against cover blank 200 positioned on first deck 1310 when pick-up assembly 1580 deposits tray blank 100, to facilitate bonding tray blank 100 to cover blank 200. Specifically, a compression surface 1586 of compression member 1584 is configured to be positioned proximate tray blank 100 when blank assembly 300 is positioned on first deck 1310. In the example embodiment, compression surface 1586 has sufficient depth in the X direction and sufficient width in the Y direction to provide a compression surface against substantially all of coupling region 320 of tray blank 100. In alternative embodiments, compression surface 1586 has sufficient depth in the X direction and sufficient width in the Y direction to provide a compression surface against less than substantially all of coupling region 320 of tray blank 100. In alternative embodiments, each compression member spring 1585 and suction cup coupling member 1581 has any suitable stiffness that enables pick-up assembly 1580 to function as described herein.

In alternative embodiments, pick-up assembly 1580 does not include compression members 1584. For example, adhesive is applied to at least a portion of coupling region 320 of tray blank 100, tray blank 100 is positioned in the at least partially overlying relationship with cover blank 200, and coupling region 320 of tray blank 100 and cover blank 200 are securely bonded together without additional compression of coupling region 320 against cover blank 200.

Also in the example embodiment, pick-up assembly 1580 includes a respective sensor 1588 disposed at opposing (with respect to the Y direction) ends of pick-up assembly 1580 to verify that tray blank 100 is successfully picked up and coupled to suction cups 1582 as gantry 1570 is moved from proximate first end 1554 to proximate second end 1556. For example, each sensor 1588 is a photo eye operable to detect a presence or absence of tray blank 100 directly beneath pick-up assembly 1580. For example, as a speed of transfer of tray blanks 100 by blank transfer assemblies 1550, 1552 is increased to facilitate increasing output of blank assemblies 300 by machine 1000, a potential for an occasional premature de-coupling of tray blank 100 from pick-up assembly 1580 may arise. Sensors 1588 facilitate detecting this condition and diverting a resulting blank assembly 300 formed without tray blank 100 from outfeed section 1400 or conveyor 1600 (shown in FIG. 5). In alternative embodiments, machine 1000 includes suitable additional or alternative mechanisms for detecting premature de-coupling of tray blank 100 from pick-up assembly 1580. In the example embodiment, additional photo eye sensors (not specifically shown) are coupled to frame 1002 of machine 1000. These photo eye sensors are positioned on the frame such that the photo eye sensors can detect if tray blank 100 or cover blank 200 falls to the ground below machine 1000.

In some embodiments, a round trip cycle by blank transfer assembly 1550, from picking up tray blank 100 from second deck 1360 proximate respect first end 1554, to depositing tray blank 100 at first deck 1310 proximate second end 1556, and back again to proximate first end 1554, is approximately 1 second or less. In alternative embodiments, the round trip transit time is greater than approximately 1 second but less than 5 seconds. In the current embodiment, first and second blank transfer assemblies 1550 and 1552 together can form 40 to 60 blank assemblies per minute.

Figure 14:
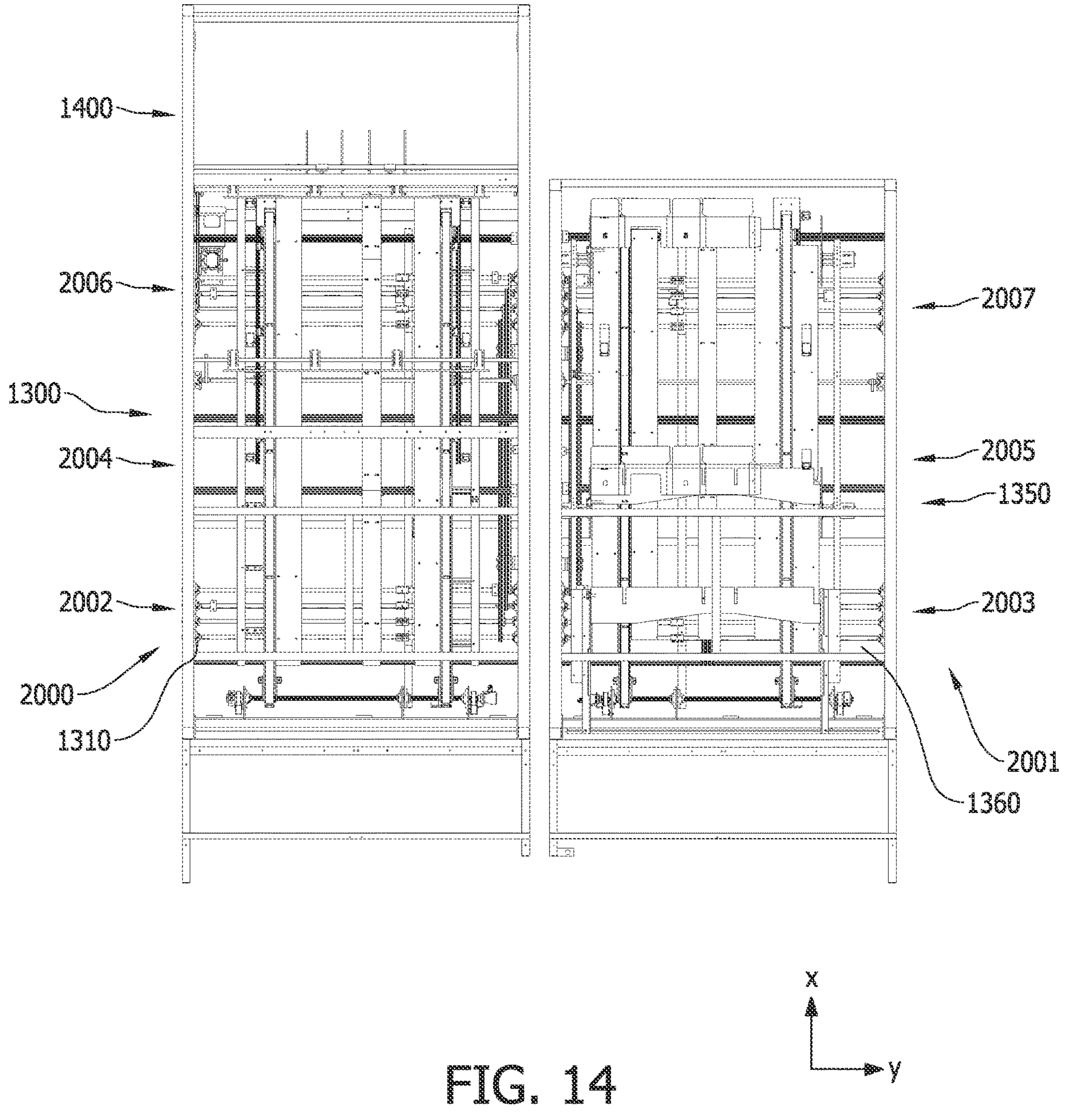
FIG. 14 is a top view of the machine shown in FIGS. 4 and 5.

FIG. 14 is a top view of machine 1000, specifically of cover blank indexing section 1300 and tray blank indexing section 1350 of machine 1000. Cover blank indexing section 1300 includes a plurality of indexing zones 2000 aligned in series along blank transfer direction X. In particular, indexing zones 2000 include, in series, a first "active" indexing zone 2002, a first "idle" indexing zone 2004, and a second active indexing zone 2006. First and second active indexing zones 2002 and 2006 are also referred to as "assembly zones" 2002, 2006. First assembly zone 2002 and second assembly zone 2006 relate to the areas on first deck 1310 where first and second blank transfer assemblies 1550 and 1552 deposit respective tray blanks 100 (shown in FIG. 1) onto respective cover blanks 200 (shown in FIG. 2) that are on first deck 1310. Second end 1556 (shown in FIG. 11) of first blank transfer assembly 1550 is generally above first assembly zone 2002. Fourth end 1560 (also shown in FIG. 11) of second blank transfer assembly 1552 is generally above second assembly zone 2006. Idle indexing zone 2004 is the area between first assembly zone 2002 and second assembly zone 2006.

First assembly zone 2002 is downstream from first blank setup section 1200 with respect to blank loading direction X. Idle indexing zone 2004 is downstream from first assembly zone 2002 with respect to direction X, and second assembly zone 2006 is downstream from idle indexing zone 2004 with respect to direction X. That is, once cover blanks, like cover blank 200, are on first deck 1310, the cover blanks 200 move from first assembly zone 2002 to idle indexing zone 2004 to second assembly zone 2006. After the blanks move through second assembly zone 2006, they are advanced into outfeed section 1400.

In the example embodiment, tray blank indexing section 1350 includes a plurality of indexing zones 2001 aligned in series along blank transfer direction X. In particular, indexing zones 2001 include, in series, a first active indexing zone 2003, a first idle indexing zone 2005, and a second active indexing zone 2007. First and second active indexing zones 2003 and 2007 are also referred to as "pick-up zones" 2003, 2007. First pick-up zone 2003 and second pick-up zone 2007 relate to the areas on second deck 1360 where first and second blank transfer assemblies 1550 and 1552 pick-up respective tray blanks 100 to be coupled to respective cover blanks 200 in assembly zones 2002 and 2006 of first deck 1310. First end 1554 (shown in FIG. 11) of first blank transfer assembly 1550 is generally above first pick-up zone 2003. Third end 1558 (also shown in FIG. 11) of second blank transfer assembly 1552 is generally above second pick-up zone 2007. Idle indexing zone 2005 is the area between first pick-up zone 2003 and second pick-up zone 2007. First pick-up zone 2003 is generally aligned with first assembly zone 2002, idle indexing zone 2005 is generally aligned with idle indexing zone 2004, and second pick-up zone 2007 is generally aligned with second assembly zone 2006.

First pick-up zone 2003 is downstream from blank setup section 1201 with respect to blank loading direction X. Idle indexing zone 2005 is downstream from first pick-up zone 2003 with respect to direction X, and second pick-up zone 2007 is downstream from idle indexing zone 2005 with respect to direction X. That is, once tray blanks, like tray blank 100, are on second deck 1360, the tray blanks 100 are configured to move from first pick-up zone 2003 to idle indexing zone 2005 to second pick-up zone 2007, and are picked up from first pick-up zone 2003 by first blank transfer assembly 1550 or are picked up from second pick-up zone 2007 by second blank transfer assembly 1552.

In at least some embodiments, the assembly zones 2002, 2006 and the pick-up zones 2003, 2007 are defined at least in part by the respective stoppers 1314, 1364 (shown in FIGS. 7 and 8, respectively). The blanks in the respective zones are advanced until the leading edges thereof contact the respective stoppers 1314, 1364, at which point their movement in blank loading direction X is halted. Accordingly, the zones of pick-up and/or assembly, and/or the positions of the blanks in such zones, may be considered to be defined by stoppers 1314, 1364.

Figure 15:
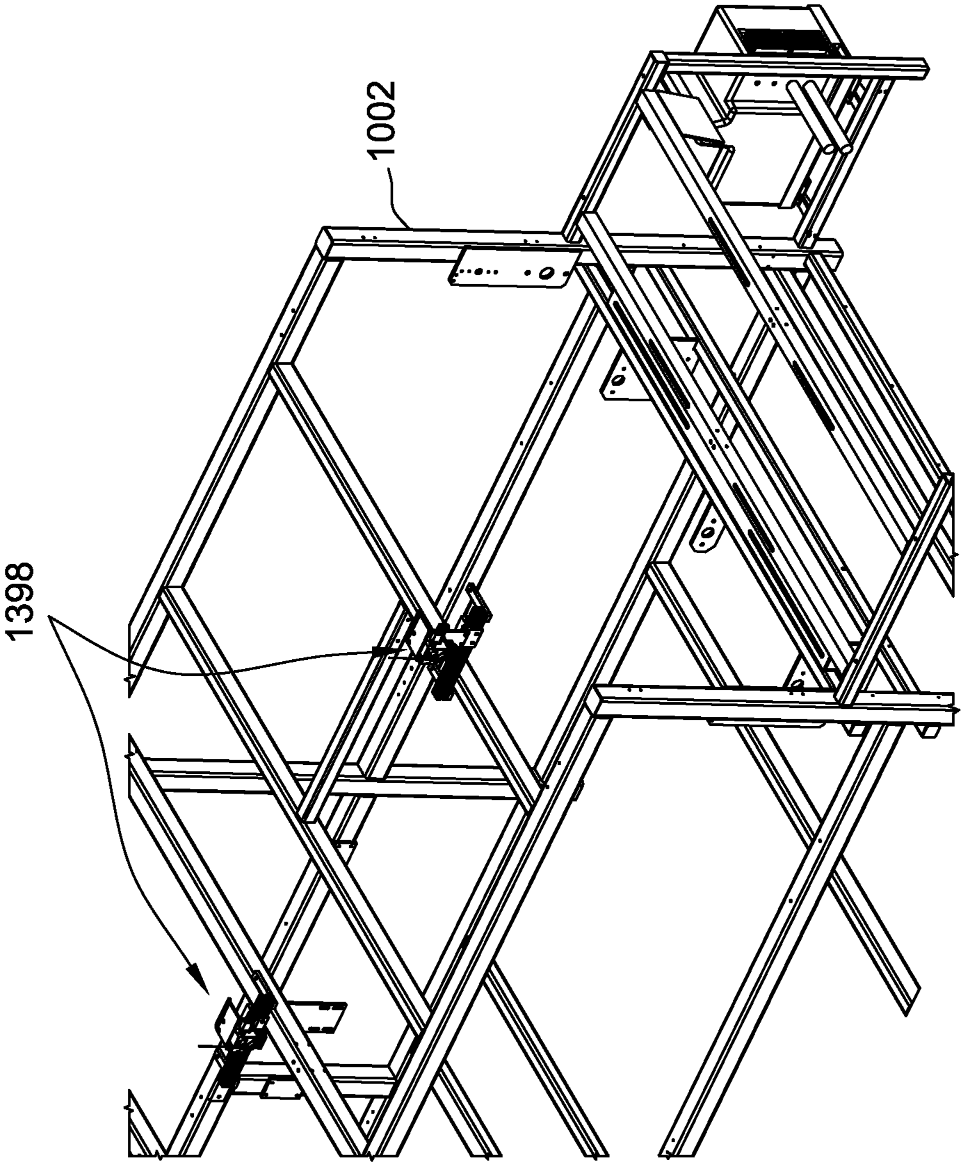
FIG. 15 is a perspective view of an example embodiment of a glue assembly of the machine shown in FIGS. 4 and 5.

FIG. 15 is a perspective view of a pair of blank adhesive applicators 1398 coupled to frame 1002 of machine 1000 (shown in FIGS. 4 and 5). With reference to FIGS. 11, 12, and 14, in the example embodiment, blank adhesive applicators 1398 are fixedly coupled to frame 1002 proximate an interface between tray blank indexing section 1350 and cover blank indexing section 1300 for both first blank transfer assembly 1550 and second blank transfer assembly 1552. More specifically, blank adhesive applicators 1398 are located in a position such that blank adhesive applicators 1398 are aligned with first and second assembly zones 2002 and 2006 and therefore are aligned with first and second pick-up zones 2003 and 2007. In the example embodiment, blank adhesive applicators 1398 are offset upstream, with respect to the X direction, from leading edge 280 of cover blank 200 such that adhesive is applied to tray blank 100 in the region thereof that overlaps cover blank 200. In alternative embodiments, blank adhesive applicator 1398 is associated with and/or positioned with respect to frame 1002 in any suitable fashion that enables blank adhesive applicator 1398 to function as described herein.

In the example embodiment, blank adhesive applicators 1398 are operable to eject an adhesive material upwardly, generally parallel to the Z direction, as a tray blank 100 is translated above a blank adhesive applicator 1398 along the Y direction by blank transfer assemblies 1550 and 1552, such that the adhesive is applied to at least a portion of coupling region 320 of tray blank 100, for tray blanks 100 carried by of each blank transfer assembly 1550 and 1552. For example, the timing of operation of blank adhesive applicators 1398 is controllable by control system 1004 such that the adhesive is precisely applied as a tray blank 100 is passing over blank adhesive applicator 1398, just prior to be deposited onto a cover blank 200. In alternative embodiments, adhesive is applied to coupling region 320, and/or to a portion of exterior surface 202 of cover blank 200 complementary to coupling region 320, from any suitable direction in any suitable fashion.

Figure 16:
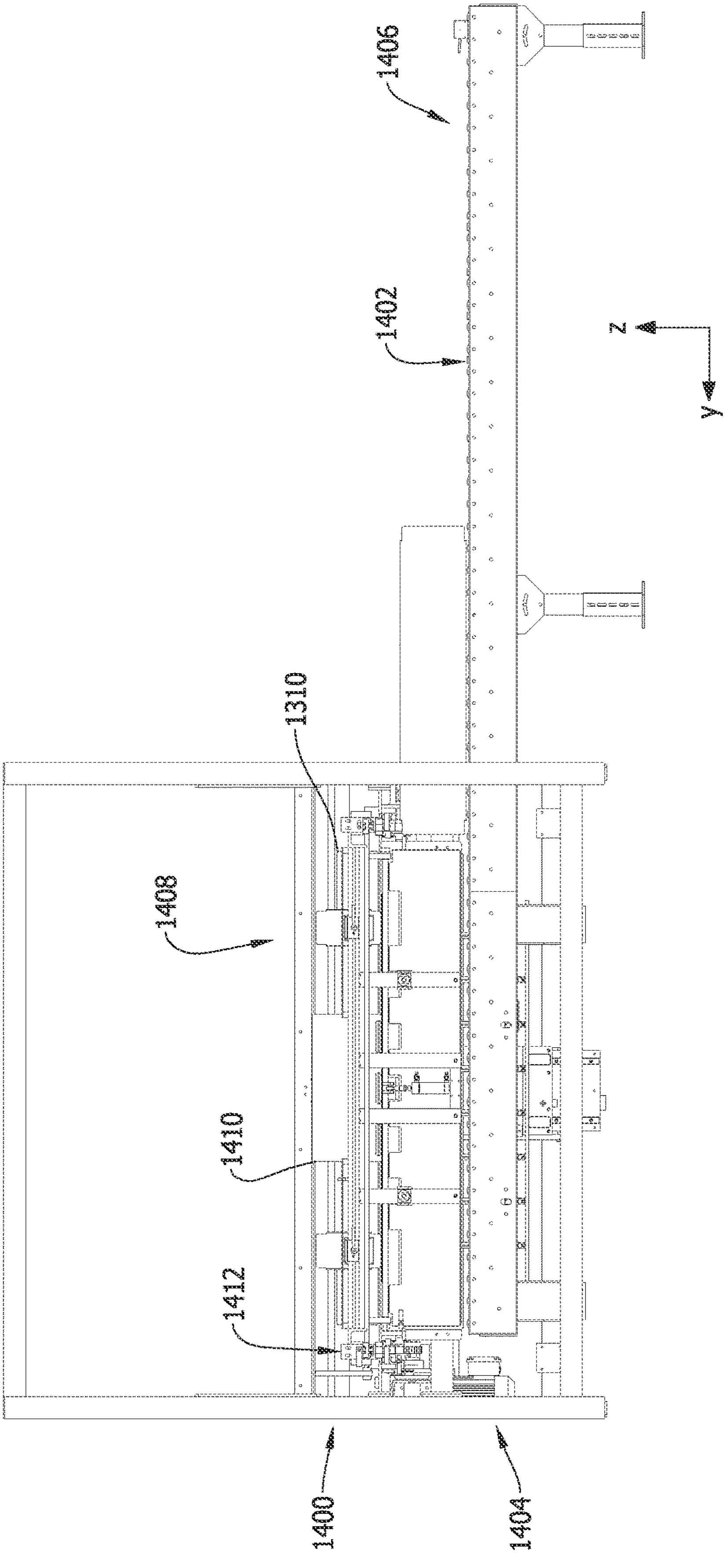
FIG. 16 is a back view of an example outfeed section of the machine shown in FIGS. 4 and 5.

FIG. 16 is a back view of outfeed section 1400. Outfeed section 1400 includes a conveyor 1402 and a blank assembly counter 1408. Conveyor 1402 extends from a first end 1404 to a second end 1406. First end 1404 of conveyor 1402 is downstream of cover blank indexing section 1300 (shown in FIG. 4). In the example embodiment, once blank assemblies 300 (shown in FIG. 3) have been indexed through cover blank indexing section 1300, blank assemblies 300 are advanced from first deck 1310 into outfeed section 1400, as described herein. Counter 1408 receives blank assemblies 300 onto arms 1410 of counter 1408. When a predetermined number of blank assemblies 300 have been stacked onto arms 1410 of counter 1408, an actuator 1412 controls arms 1410 to retract, dropping blank assemblies 300 down to conveyor 1402. In some embodiments, counter 1408 includes an optical sensor to sense number of blank assemblies 300 deposited thereon. In other embodiments, counter 1408 includes a weight sensor to determine the number of blank assemblies 300 thereon. Counter 1408 may include additional or alternative components to facilitate determining when the predetermined number of blank assemblies 300 is deposited thereon. In the example embodiment, blank assemblies 300 are transferred onto conveyor 1402 by arms 1410 of counter 1408 and are advanced along conveyor 1402 onto conveyor section 1600 of machine 1000.

Machine 1000 is generally configured to operate as follows, with reference to FIGS. 1-17, and only describing in detail first blank transfer assembly 1550 for ease of description, knowing that first blank transfer assembly 1550 and second blank transfer assembly 1552 operate in essentially the same way. In operation, first blank setup assembly 1202 positions cover blanks 200 onto first end 1311 of first deck 1310, such that cover blanks 200 are positioned in cover blank indexing section 1300. Second blank setup assembly 1203 positions tray blanks 100 onto first end 1361 of second deck 1360, such that tray blanks 100 are positioned in tray blank indexing section 1350. Actuator 1308 is controlled, commanded, and/or instructed to translate lugs 1312 in the X direction of cover blank indexing section 1300 to move cover blanks 200 along cover blank indexing section 1300. Actuator 1358 is controlled, commanded, and/or instructed to translate lugs 1362 in the X direction of tray blank indexing section 1350 to move tray blanks 100 along tray blank indexing section 1350. Further, actuator 1308 is controlled, commanded, and/or instructed to translate lugs 1312 in the X direction to a second position, in which lugs 1312 are positioned out of a path traveled by forwarding assembly 1302 as it transfers the formed blank assembly 300 to outfeed section 1400.

Servomechanisms 1562 and 1564 are controlled, commanded, and/or instructed to rotate simultaneously in the clockwise direction (in the view of FIG. 11) to translate gantry 1570 opposite the Y direction to proximate first end 1554 of blank transfer assembly 1550. With gantry 1570 proximate first end 1554, first servomechanism 1562 is controlled, commanded, and/or instructed to rotate in the counterclockwise direction and second servomechanism 1564 is controlled, commanded, and/or instructed to rotate simultaneously in the clockwise direction to translate lift arm 1571 opposite the Z direction, such that pick-up assembly 1580 is positioned in close proximity to tray blank 100 positioned on second deck 1360 (e.g., in first pick-up zone 2003). When pick-up assembly 1580 is positioned in close proximity to tray blank 100, stoppers 1364 on second deck 1360 withdraw from leading edge 160 of tray blank 100 such that stoppers 1364 do not interfere with pick-up assembly 1580. Suction cups 1582 are controlled, commanded, and/or instructed to activate, coupling tray blank 100 to pick-up assembly 1580. First servomechanism 1562 is controlled, commanded, and/or instructed to rotate in the clockwise direction and second servomechanism 1564 is controlled, commanded, and/or instructed to rotate simultaneously in the counterclockwise direction (in the view of FIG. 11) to translate lift arm 1571 in the Z direction, such that pick-up assembly 1580 lifts tray blank 100 off of second deck 1360.

Further in operation, servomechanisms 1562 and 1564 are controlled, commanded, and/or instructed to rotate simultaneously in the counterclockwise direction (in the view of FIG. 11) to translate gantry 1570 in the Y direction to carry tray blank 100 towards second end 1556 of first blank transfer assembly 1550. Stoppers 1364 on second deck 1360 are substantially simultaneously activated to stop the next tray blank 100 being advanced on second deck 1360 (e.g., into first pick-up zone 2003). In certain embodiments, as gantry 1570 is translated towards second end 1556, sensors 1588 transmit a signal to control system 1004 to indicate whether tray blank 100 remains coupled to pick-up assembly 1580. Moreover, as gantry 1570 is translated towards second end 1556, tray blank 100 passes over blank adhesive applicator 1398. Blank adhesive applicator 1398 is controlled, commanded, and/or instructed to apply adhesive to at least a portion of coupling region 320 of interior surface 104 of tray blank 100 as tray blank 100 passes above applicator 1398.

In the example embodiment, as gantry 1570 arrives proximate second end 1556, servomechanisms 1562 and 1564 are controlled, commanded, and/or instructed to position gantry 1570 with respect to the Y direction such that first side free edge 120 of tray blank 100 is offset from first free edge 220 of cover blank 200 by first predetermined offset distance $d_1$ (shown in FIG. 3). Also in the example embodiment, fold lines 132, 134, 136, and 138 of tray blank 100 are lined up with leading edge 280 of cover blank 200 with respect to the X direction. When gantry 1570 is positioned over cover blank 200 on first deck 1310, stoppers 1314 on first deck 1310 withdraw such that stoppers 1314 do not interfere with the coupling of tray blank 100 to cover blank 200. In alternative embodiments, machine 1000 includes any suitable additional or alternative structure that facilitates positioning tray blank 100 with respect to cover blank 200 with respect to the X and/or Y direction(s).

With gantry 1570 proximate second end 1556, first servomechanism 1562 is controlled, commanded, and/or instructed to rotate in the counterclockwise direction and second servomechanism 1564 is controlled, commanded, and/or instructed to rotate simultaneously in the clockwise direction to translate lift arm 1571 opposite the Z direction, such that pick-up assembly 1580 positions tray blank 100 in close proximity to cover blank 200 positioned on first deck 1310 (e.g., in first assembly zone 2002). In certain embodiments, pick-up assembly 1580 is moved opposite the Z direction to an extent such that compression member 1584 exerts a force opposite the Z direction on at least a portion of coupling region 320 of tray blank 100 and the adjacent overlaid portion of cover blank 200. Suction cups 1582 are controlled, commanded, and/or instructed to deactivate, releasing tray blank 100 from pick-up assembly 1580.

Further in operation, first servomechanism 1562 is controlled, commanded, and/or instructed to rotate in the clockwise direction and second servomechanism 1564 is controlled, commanded, and/or instructed to rotate simultaneously in the counterclockwise direction (in the view of FIG. 11) to translate lift arm 1571 in the Z direction, to provide clearance between pick-up assembly 1580 and first deck 1310 (and, subsequently, between pick-up assembly 1580 and second deck 1360). Stoppers 1314 on first deck 1310 are then activated to stop the next cover blank 200 being advanced on first deck 1310 (e.g., into first assembly zone 2002). After the desired clearance is obtained, servomechanisms 1562 and 1564 are controlled, commanded, and/or instructed to rotate simultaneously in the clockwise direction (in the view of FIG. 11) to translate gantry 1570 opposite the Y direction to proximate first end 1554 of first blank transfer assembly 1550 to retrieve another tray blank 100.

It should be understood that tray blanks 100 do not have to be coupled to cover blanks 200 for machine 1000 to function as described herein. Cover blanks 200 may be coupled to tray blanks 100 without parting from the scope of this disclosure.

FIGS. 17A-17E are top views of a simplified process implemented using machine 1000 (shown in FIGS. 4 and 5). Specifically, FIGS. 17A-17E depict a simplified cover blank indexing section 1300 and blank transfer section 1500 and illustrate the offset operation of first and second blank transfer assemblies 1550 and 1552. The cover blanks described with respect to this simplified process are identical or substantially similar to cover blank 200 (shown in FIG. 2). Likewise, the tray blanks described with respect to this simplified process are identical or substantially similar to tray blanks 100 (shown in FIG. 1), and the blank assemblies (i.e., cover blanks with tray blanks coupled thereto) are identical or substantially similar to blank assembly 300 (shown in FIG. 3). The cover blanks are illustrated as squares and the tray blanks coupled to the cover blanks are illustrated as labelled rectangles for ease of illustration. Tray blanks are labelled as "TRAY" and those labelled with A1, A2, A3, etc., are deposited onto cover blanks by the first blank transfer assembly 1550 (shown in FIG. 11). Tray blanks labelled with B1, B2, B3, etc., are deposited by the second blank transfer assembly 1552 (also shown in FIG. 11).

Figures 17A, 17B, 17C:
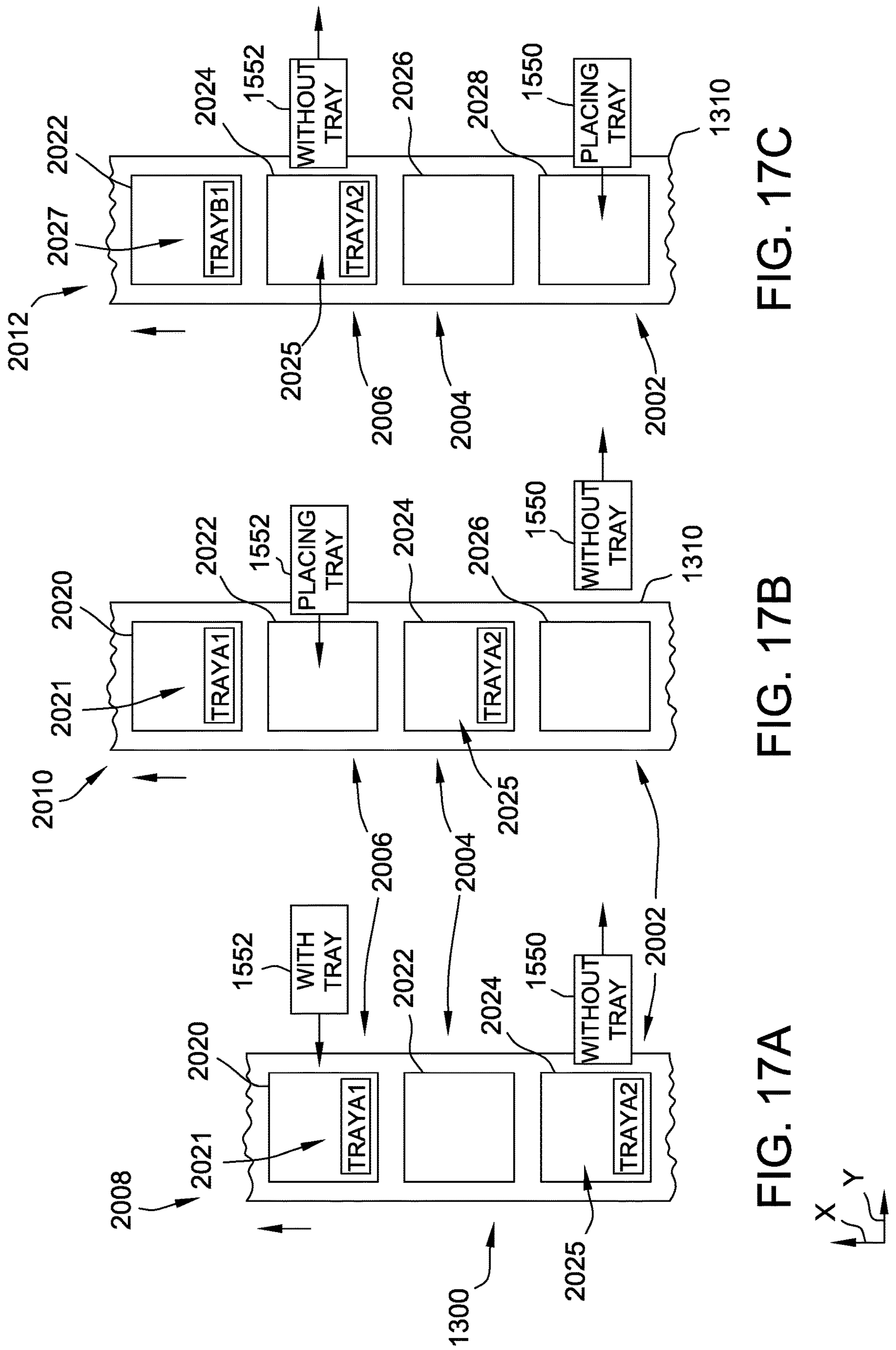
FIGS. 17A-17E depict a simplified process of coupling the tray blanks to the cover blanks.

FIG. 17A shows a first step 2008 of the simplified process implemented using machine 1000. A first blank assembly 2021 is positioned in second assembly zone 2006, a second cover blank 2022 is positioned in idle indexing zone 2004, and a second blank assembly 2025 is positioned in first assembly zone 2002. First blank assembly 2021 includes a tray blank A1 that was deposited on and coupled to a first cover blank 2020 by first blank transfer assembly 1550 in a prior step. Second cover blank 2022 is in idle indexing zone 2004. Second blank assembly 2025 was just formed from a tray blank A2 deposited on and coupled to a third cover blank 2024 in first assembly zone 2002. Immediately thereafter, as indicated by the directional arrow adjacent thereto, first blank transfer assembly 1550 is moving away from first assembly zone 2002 (i.e., towards first end 1554 thereof) to first pick-up zone 2003 (shown in FIG. 14) to pick up another tray blank (i.e., a tray blank A3). Simultaneously, as indicated by the directional arrow adjacent thereto, second blank transfer assembly 1552 is moving toward second assembly zone 2006 (i.e., towards fourth end 1560 thereof) with a tray blank carried thereby.

FIG. 17B shows a second step 2010 of the simplified process. First blank assembly 2021 has been indexed into outfeed section 1400. Second cover blank 2022 has been indexed into second assembly zone 2006 and is positioned to receive a tray blank B1 (shown in FIG. 17C) from second blank transfer assembly 1552. Second blank assembly 2025 has been indexed into idle indexing zone 2004. A fourth cover blank 2026 has been transferred into first assembly zone 2002. First blank transfer assembly 1550 is moving into first pick-up zone 2003 to pick up tray blank A3 (see FIG. 17D). Second blank transfer assembly 1552 is moving into second assembly zone 2006 to couple tray blank B1 to second cover blank 2022.

FIG. 17C shows a third step 2012 of the simplified process. Tray blank B1 has been deposited on and coupled to second cover blank 2022 by second blank transfer assembly 1552, thereby forming a third blank assembly 2027. Third blank assembly 2027 was subsequently indexed into outfeed section 1400. Second blank assembly 2025 has been indexed into second assembly zone 2006. Fourth cover blank 2026 has been indexed into idle indexing zone 2004. A fifth cover blank 2028 has been transferred into first assembly zone 2002. First blank transfer assembly 1550 is moving into first assembly zone 2002 to couple tray blank A3 to fifth cover blank 2028. Second blank transfer assembly 1552 is moving into second pick-up zone 2007 to pick up a tray blank B2 (see FIG. 17E).

Figure 17D:
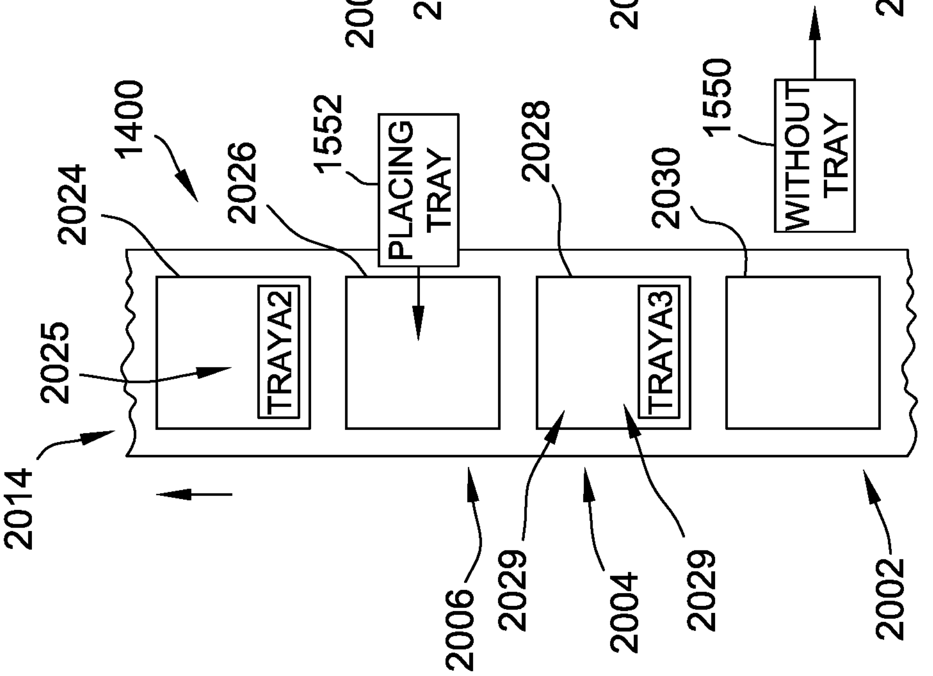

FIG. 17D shows a fourth step 2014 of the simplified process. Third blank assembly 2025 has been indexed into outfeed section 1400. Fourth cover blank 2026 has been indexed into second assembly zone 2006. Tray blank A3 has been deposited on and coupled to fifth cover blank 2028 by first blank transfer assembly 1550, thereby forming a fourth blank assembly 2029. Fourth blank assembly 2029 has been indexed into idle indexing zone 2004. A sixth cover blank 2030 has been transferred into first assembly zone 2002. First blank transfer assembly 1550 is moving toward first pick-up zone 2003 to retrieve a tray blank A4, not specifically shown. Second blank transfer assembly 1552 is moving into second assembly zone 2006 to couple tray blank B2 to fourth cover blank 2026.

Figure 17E:
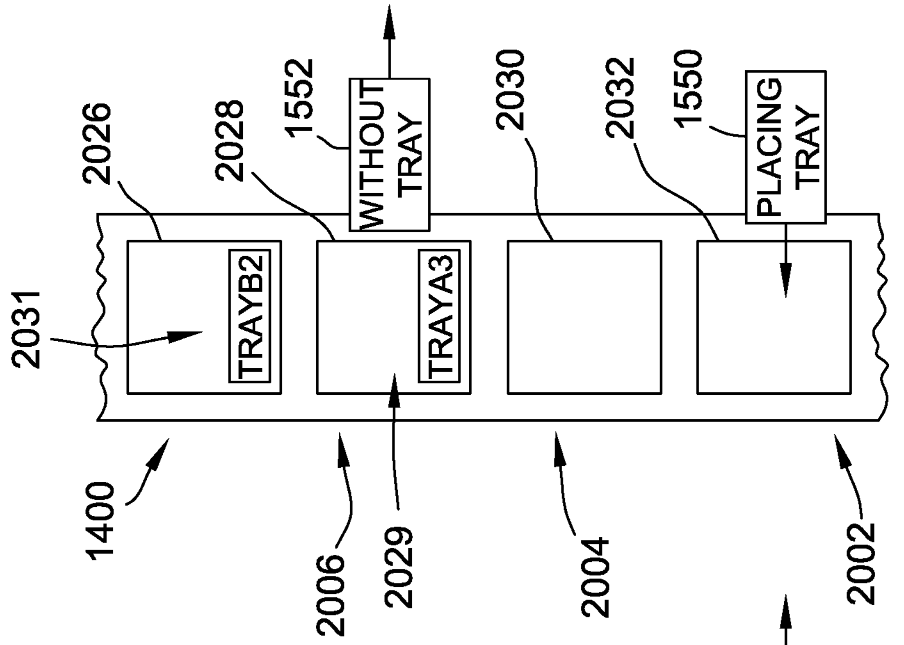

FIG. 17E shows a fifth step 2016 of the simplified process. Tray blank B2 has been deposited on and coupled to fourth cover blank 2026 by second blank transfer assembly 1552, thereby forming a fifth blank assembly 2031. Fifth blank assembly 2031 was subsequently indexed into outfeed section 1400. Fourth blank assembly 2029 has been indexed into second assembly zone 2006. Sixth cover blank 2030 has been indexed into idle indexing zone 2004. A seventh cover blank 2032 has been transferred into first assembly zone 2002. First blank transfer assembly 1550 is moving into first assembly zone 2002 to couple tray blank A4, not specifically shown, to seventh cover blank 2032. Second blank transfer assembly 1552 is moving into second pick-up zone 2007 to pick up a tray blank B3, not specifically shown.

FIGS. 17A-17E show how first blank transfer assembly 1550 and second blank transfer assembly 1552 are operationally offset from one another. As used herein, "operationally offset" refers to the action of first and second blank transfer assemblies 1550, 1552 being offset, staggered, or alternating in their respective operations. In one example, when first blank transfer assembly 1550 is proximate first end 1554 thereof, second blank transfer assembly 1552 is proximate fourth end 1560 thereof. In another example, when first blank transfer assembly 1550 is picking up a tray blank in first pick-up zone 2003, second blank transfer assembly 1552 is depositing a tray blank onto a cover blank in second assembly zone 2006. In yet another example, while one of first and second blank transfer assemblies 1550, 1552 is moving toward first deck 1310, the other is moving away from first deck 1310. Since first blank transfer assembly 1550 and second blank transfer assembly 1552 are operationally offset from one another, the amount of blank assemblies 300 (shown in FIG. 3) that are made by machine 1000 increases. In the current embodiment, machine 1000 (shown in FIGS. 4 and 5) can produce 40 to 50 blank assemblies 300 per minute.

Figure 18:
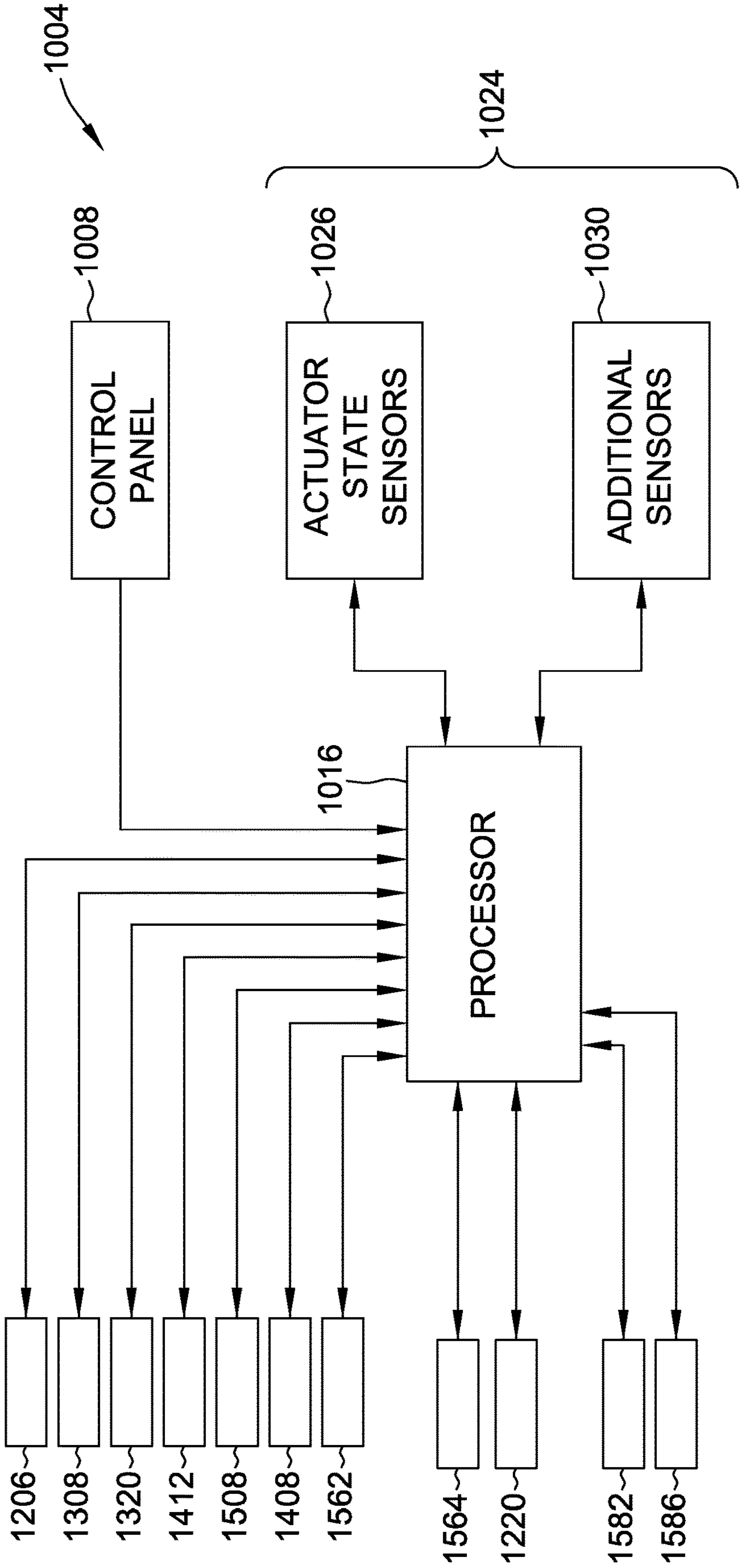
FIG. 18 is a block diagram of an example control system that may be used with the machine shown in FIGS. 4 and 5.

FIG. 18 is a schematic block diagram of control system 1004. In the example embodiment, control system 1004 includes at least one control panel 1008 and at least one processor 1016. In certain embodiments, reprogrammed recipes or protocols embodied on a non-transitory computer-readable medium are programmed in and/or uploaded into processor 1016 and such recipes include, but are not limited to, predetermined speed and timing profiles, wherein each profile is associated with forming blank assemblies from cover blanks and tray blanks each having a predetermined size and shape.

In the example embodiment, one or more of actuators 1206, 1308, 1320, 1412, and 1508, blank assembly counter 1408, transfer mechanism servomechanisms 1562 and 1564, suction cups 1220 and 1582, and compression members 1584 are integrated with machine control system 1004, such that control system 1004 is configured to transmit signals to each to control its operation. Moreover, a plurality of suitable sensors 1024 are disposed on machine 1000 and provide feedback to control system 1004 to enable machine 1000 to function as described herein. For example, plurality of sensors 1024 includes a first set 1026 of sensors to monitor a state of one or more of actuators 1206, 1308, 1320, 1412, and 1508, blank assembly counter 1408, transfer mechanism servomechanisms 1562 and 1564, suction cups 1220 and 1582, and compression members 1584. For example, the state includes at least a position of a respective actuator.

In certain embodiments, control system 1004 is configured to facilitate selecting a speed and/or timing of the movement and/or activation of the devices and/or components associated with each of actuators 1206, 1308, 1320, 1412, and 1508, blank assembly counter 1408, transfer mechanism servomechanisms 1562 and 1564, suction cups 1220 and 1582, and compression members 1584. The devices and/or components may be controlled either independently or as part of one or more linked mechanisms. For example, in embodiments where one or more of actuators 1206, 1308, 1320, 1412, 1508, 1562, and 1564 is a servomechanism, the speed and timing of each such actuator can be controlled independently as commanded by control system 1004.

In certain embodiments, control panel 1008 allows an operator to select a recipe that is appropriate for a particular blank assembly. The operator typically does not have sufficient access rights/capabilities to alter the recipes, although select users can be given privileges to create and/or edit recipes. Each recipe is a set of computer instructions that instruct machine 1000 as to forming the blank assembly. For example, machine 1000 is instructed as to speed and timing of picking a cover blank from feed section 1100, the speed and timing of picking a tray blank from feed section 1150, speed and timing of picking tray blanks from deck 1510 and transferring via blank transfer section 1500, speed and timing of depositing and/or compressing the tray blank on the cover blank to form the blank assembly, and speed and timing of transferring the formed blank assembly to outfeed section 1400. In embodiments where one or more actuators is a servomechanism, control system 1004 is able to control the movement of each such actuator independently relative to any other component of machine 1000. This enables an operator to maximize the number of blank assemblies that can be formed by machine 1000, easily change the size of blank assemblies being formed on machine 1000, and automatically change the type of blank assemblies being formed on machine 1000 while reducing or eliminating manually adjustments of machine 1000.

The example embodiments described herein provide a blank assembly-forming machine that advantageously facilitates formation of a blank assembly having tray blank coupled to a cover blank. More specifically, the example embodiments described herein reduce or eliminate a need for additional displaying containers when the blank assembly is eventually formed into a container.

Example embodiments of methods and a machine for forming a blank assembly from a cover blank and a tray blank are described above in detail. The methods and machine are not limited to the specific embodiments described herein, but rather, components of systems and/or steps of the methods may be utilized independently and separately from other components and/or steps described herein. For example, the machine may also be used in combination with other blanks, and is not limited to practice with only the blanks described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A machine comprising:

a first deck coupled to a frame, wherein the first deck comprises a first assembly zone, a second assembly zone, and an idle indexing zone located between the first assembly zone and the second assembly zone;

a second deck coupled to the frame;

a first blank transfer assembly comprising a first pick-up assembly moveable between a first pick-up position, in which the first pick-up assembly is positioned to pick up a first blank from the second deck, and a first deposit position, in which the first pick-up assembly is positioned to deposit the first blank onto the first deck proximate the first assembly zone; and a second blank transfer assembly comprising a second pick-up assembly moveable between a second pick-up position, in which the second pick-up assembly is positioned to pick up a second blank from the second deck, and a second deposit position, in which the second pick-up assembly is positioned to deposit the second blank onto the first deck proximate the second assembly zone, wherein the first blank transfer assembly and the second blank transfer assembly are independently operable and operationally offset in an alternating manner when respectively moving the first pick-up assembly between the first pick-up position and the first deposit position and the second pick-up assembly between the second pick-up position and the second deposit position.

2. The machine in accordance with claim 1, wherein the first blank transfer assembly and the second blank transfer assembly are operationally offset such that the first pick-up assembly is in the first pick-up position when the second pick-up assembly is in the second deposit position.

3. The machine in accordance with claim 1, wherein the machine defines a longitudinal axis extending parallel to the first and second decks and a lateral axis extending transversely to the longitudinal axis, the second blank transfer assembly being spaced from the first blank transfer assembly in a direction parallel to the longitudinal axis.

4. The machine in accordance with claim 3, wherein the first pick-up assembly is moveable between the first pick-up position and the first deposit position and the second pick-up assembly is moveable between the second pick-up position and the second deposit position in a direction parallel to the lateral axis.

5. The machine in accordance with claim 3, wherein the first blank transfer assembly and the second blank transfer assembly are operationally offset such that the first pick-up assembly and the second pick-up assembly are moved in opposing directions parallel to the lateral axis.

6. The machine in accordance with claim 1, further comprising:

a first adhesive applicator configured to activate to apply adhesive as the first blank transfer assembly moves between the first pick-up position and the first deposit position; and a second adhesive applicator configured to activate to apply adhesive as the second blank transfer assembly moves between the second pick-up position and the second deposit position.

7. The machine in accordance with claim 1, further comprising:

a first blank setup assembly configured to transfer a first series of blanks onto the first deck;

a first forwarding assembly configured to advance the first series of blanks on the first deck in a blank setup direction;

a second blank setup assembly configured to transfer a second series of blanks onto the second deck; and a second forwarding assembly configured to advance the second series of blanks in the blank setup direction.

8. The machine in accordance with claim 7, further comprising:

a first plurality of stoppers downstream of a first position in the blank setup direction;

a second plurality of stoppers downstream of a second position in the blank setup direction; and a plurality of lugs configured to advance a first one of the first series of blanks to the first position wherein a leading edge of the first one of the first series of blanks is engaged with the first plurality of stoppers and to advance a second one of the first series of blanks to the second position wherein a leading edge of the second one of the first series of blanks is engaged with the second plurality of stoppers.

9. The machine in accordance with claim 1, wherein the first assembly zone is located at one end of the first deck, and the second assembly zone is located at another end of the first deck.

10. A machine for forming a blank assembly including a first cover blank and a first tray blank coupled to the first cover blank and a second cover blank and a second tray blank coupled to the second cover blank, said machine comprising:

a first deck coupled to a frame, wherein the first and second cover blanks are positioned on the first deck, and wherein the first deck comprises a first assembly zone, a second assembly zone, and an idle indexing zone located between the first assembly zone and the second assembly zone;

a second deck coupled to the frame, wherein the first and second tray blanks are positioned on the second deck;

a first blank transfer assembly comprising a first pick-up assembly moveable between a first pick-up position, in which the first pick-up assembly is configured to pick up the first tray blank from the second deck, and a first deposit position, in which the first pick-up assembly is configured to deposit the first tray blank in an at least partially overlying relationship with the first cover blank positioned on the first deck proximate the first assembly zone; and a second blank transfer assembly comprising a second pick-up assembly moveable between a second pick-up position, in which the second pick-up assembly is configured to pick up the second tray blank from the second deck, and a second deposit position, in which the second pick-up assembly is configured to deposit the second tray blank in an at least partially overlying relationship with the second cover blank positioned on the first deck proximate the second assembly zone, wherein the first blank transfer assembly and the second blank transfer assembly are independently operable and operationally offset in an alternating manner when the first pick-up assembly is moved to transfer the first tray blank and the second pick-up assembly is moved to transfer the second tray blank.

11. The machine in accordance with claim 10, wherein the first blank transfer assembly and the second blank transfer assembly are operationally offset from one another such that the first pick-up assembly is in the first deposit position when the second pick-up assembly is in the second pick-up position.

12. The machine in accordance with claim 10, wherein the first deck extends from a first deck end to a second deck end and wherein the second deck extends from a third deck end to a fourth deck end.

13. The machine in accordance with claim 12, further comprising:

a first blank setup assembly configured to transfer the first and second cover blanks onto the first deck in series at the first deck end;

a first forwarding assembly configured to advance the first and second cover blanks in a blank setup direction;

a second blank setup assembly configured to transfer the first and second tray blanks onto the second deck in series at the third deck end; and a second forwarding assembly configured to advance the first and second tray blanks in the blank setup direction.

14. The machine in accordance with claim 13, further comprising:

a first plurality of stoppers downstream from a first position in the blank setup direction;

a second plurality of stoppers downstream from a second position in the blank setup direction; and a plurality of lugs configured to advance the first cover blank to the first position wherein a leading edge of the first cover blank is engaged with the first plurality of stoppers and to advance the second cover blank to the second position wherein a leading edge of the second cover blank is engaged with the second plurality of stoppers.

15. The machine in accordance with claim 10, wherein the first assembly zone is located at a first deck end, and the second assembly zone is located at a second deck end.

16. The machine in accordance with claim 10, wherein the first blank transfer assembly has a first sensor configured to monitor placement of the first tray blank relative to the first blank transfer assembly, and wherein the second blank transfer assembly has a second sensor configured to monitor placement of the second tray blank relative to the second blank transfer assembly.

17. A machine comprising:

a first deck coupled to a frame, wherein the first deck comprises a first assembly zone, a second assembly zone, and an idle indexing zone located between the first assembly zone and the second assembly zone;

a second deck coupled to the frame;

a first gantry configured to move between the first deck and the second deck to transfer a first series of blanks from the second deck to the first deck using a first pick-up assembly coupled to the first gantry, wherein each one of the first series of blanks is transferred to proximate the first assembly zone; and a second gantry configured to move between the first deck and the second deck to transfer a second series of blanks from the second deck to the first deck using a second pick-up assembly coupled to the second gantry, wherein each one of the second series of blanks is transferred to proximate the second assembly zone, wherein the first gantry and the second gantry are independently operable and operationally offset such that the first pick-up assembly and the second pick-up assembly transfer the first and second series of blanks, respectively, in an alternating manner.

18. The machine in accordance with claim 17, wherein the first gantry moves away from the first deck as the second gantry moves toward the first deck, and wherein the first gantry moves away from the second deck as the second gantry moves toward the second deck.

19. The machine in accordance with claim 17, wherein the first deck extends from a first deck end to a second deck end and wherein the second deck extends from a third deck end to a fourth deck end.

20. The machine in accordance with claim 17, wherein the first assembly zone is located at a first deck end, and the second assembly zone is located at a second deck end.

* * * * *